United States Patent
Jepson

(10) Patent No.: US 9,452,875 B2
(45) Date of Patent: Sep. 27, 2016

(54) CLOSURES FOR SEALING OR PRESSURIZING PARTIALLY-FILLED BEVERAGE CONTAINERS AND METHODS RELATED THERETO

(71) Applicant: Craig S. Jepson, San Francisco, CA (US)

(72) Inventor: Craig S. Jepson, San Francisco, CA (US)

(73) Assignee: Stonevale Products, LLC, Burbank, CA (US)

( * ) Notice: Subject to any disclaimer, the term of this patent is extended or adjusted under 35 U.S.C. 154(b) by 531 days.

(21) Appl. No.: 13/783,020

(22) Filed: Mar. 1, 2013

(65) Prior Publication Data

US 2014/0246396 A1  Sep. 4, 2014

(51) Int. Cl.
*B65D 81/24* (2006.01)
*B65B 1/04* (2006.01)
*G06F 17/30* (2006.01)

(52) U.S. Cl.
CPC .............. *B65D 81/245* (2013.01); *B65B 1/04* (2013.01); *G06F 17/30* (2013.01)

(58) Field of Classification Search
CPC .............................. B65D 81/245; B65B 1/04
USPC ........... 473/604; 53/487, 488; 215/231, 269, 215/260; 222/386.5; 220/720, 232
See application file for complete search history.

(56) References Cited

U.S. PATENT DOCUMENTS

| | | |
|---|---|---|
| 447,974 A | 3/1891 | Rheinstrom |
| 601,877 A | 4/1898 | Lochmann |
| 2,063,430 A | 12/1936 | Graser |
| 3,129,857 A | 4/1964 | Croy et al. |
| 3,294,289 A | 12/1966 | Bayne et al. |
| 3,343,701 A | 9/1967 | Mahoney |
| 3,876,115 A | 4/1975 | Venus, Jr. et al. |
| 4,392,578 A | 7/1983 | Fipp et al. |
| 4,482,072 A | 11/1984 | Hankins |
| 4,524,877 A | 6/1985 | Saxby et al. |

(Continued)

FOREIGN PATENT DOCUMENTS

| DE | 33 30 859 | 3/1984 |
|---|---|---|
| EP | 0 378 715 A1 | 7/1990 |

(Continued)

OTHER PUBLICATIONS

International Search and Written Opinion of Aug. 6, 2014 for International Application No. PCT/US2014/013540 filed Jan. 29, 2014. 18 pages.

(Continued)

*Primary Examiner* — Anthony Stashick
*Assistant Examiner* — Raven Collins
(74) *Attorney, Agent, or Firm* — Knobbe, Martens, Olson & Bear, LLP

(57) ABSTRACT

Apparatus and methods for sealing beverage containers are disclosed. In one embodiment, a beverage container cap for resealing a beverage container comprises a cap member and an inflatable member. The cap member has an interior side for sealingly coupling with an opening of a bottle. The cap member defines a pathway for selectively communicating gas through the cap member. For example, a pump can provide air through the pathway and to the interior side of the cap member. The inflatable member is configured to couple to the cap member and to expand in volume upon receiving gas from the pathway. The inflatable member includes a fluid impermeable layer and an elastic layer.

42 Claims, 10 Drawing Sheets

(56) References Cited

U.S. PATENT DOCUMENTS

| | | |
|---|---|---|
| 4,640,426 A | 2/1987 | Wasley |
| 4,684,033 A | 8/1987 | Marcus |
| 4,723,670 A | 2/1988 | Robinson et al. |
| 4,763,802 A | 8/1988 | Johnston |
| 4,768,665 A | 9/1988 | Ballas |
| 4,809,884 A | 3/1989 | Stackhouse |
| 4,823,968 A | 4/1989 | Handzlik |
| 5,207,339 A | 5/1993 | Shyu |
| 5,294,010 A | 3/1994 | Tschida |
| 5,322,094 A | 6/1994 | Janesko |
| D352,900 S | 11/1994 | Nhan |
| 5,499,758 A | 3/1996 | McCann et al. |
| 5,653,352 A | 8/1997 | Kim |
| 5,667,110 A | 9/1997 | McCann et al. |
| 5,823,372 A | 10/1998 | Levine |
| 6,220,311 B1 | 4/2001 | Litto |
| 6,352,165 B1 | 3/2002 | DiFelice |
| 6,502,725 B1 | 1/2003 | Alexander |
| 6,651,834 B2 | 11/2003 | Wong |
| 6,786,364 B2 * | 9/2004 | McBride ............ B67D 7/0244 222/105 |
| 7,051,901 B2 | 5/2006 | Hickert |
| 7,367,479 B2 | 5/2008 | Sitz |
| 7,395,949 B2 | 7/2008 | Ehret et al. |
| 7,597,124 B2 | 10/2009 | Litto |
| 7,779,856 B2 * | 8/2010 | Adams et al. ................ 137/210 |
| 2002/0077202 A1 * | 6/2002 | Guenther et al. ............ 473/604 |
| 2003/0230356 A1 | 12/2003 | Leveen |
| 2011/0139743 A1 | 6/2011 | Piwko |
| 2011/0278297 A1 | 11/2011 | Corti |

FOREIGN PATENT DOCUMENTS

| | | |
|---|---|---|
| FR | 2 915 967 | 11/2008 |
| GB | 2 249 084 A | 4/1992 |
| GB | 2 299 806 A | 10/1996 |
| JP | 2005-112407 A | 4/2005 |
| WO | WO 95/21109 | 8/1995 |
| WO | WO 03/046386 A1 | 6/2003 |
| WO | WO 2011-064294 | 6/2011 |

OTHER PUBLICATIONS

Invitation to Pay Additional Fees and Communication Relating to the Results of the Partial International Search mailed May 19, 2014 for International Application No. PCT/US2014/013540 filed Jan. 29, 2014. 7 pages.

Amazon.com webpage for Air Cork Wine Preserver, http://www.amazon.com/Air-Cork-AC-Wine-Preserver/dp/B00837T7KG/ref=sr_1_3?s=kitchen&ie=UTF8&qid=1444178907&sr=1-3&keywords=air+cork (printed: Oct. 15, 2015, with reviews dated back to Jun. 26, 2012).

Amazon.com webpage for Air Cork Wine Preserver Replacement Balloon Double-Pack, http://www.amazon.com/Air-Cork-Preserver-Replacement-Double-Pack/dp/B00JJTCG28/ref=pd_sim_79_1?ie=UTF8&refRID=0A4PCTRDVHDEQBHYX42C&dpID=41crPdfjC4L&dpSrc=sims&preST=_AC_UL160_SR104%2C160_(printed: Oct. 15, 2015).

* cited by examiner

CLOSURES FOR SEALING OR PRESSURIZING PARTIALLY-FILLED BEVERAGE CONTAINERS AND METHODS RELATED THERETO

FIELD

This invention relates generally to closures for beverage containers, and in particular to closures having an inflatable member.

BACKGROUND OF THE INVENTION

Beverages such as wine, juices, beer and carbonated soft drinks, are typically sold in glass and plastic containers, namely bottles, which are sealed by original factory closures. The purpose of the closure is to seal the container and, in the case of carbonated beverages, maintain the contents under pressure until the container is opened for dispensing the beverage. Some large beverage containers, for example in the two- to three-liter range, are provided with re-usable screw cap closures for resealing the container after a portion of the beverage has been served. Other containers are meant to be closed with corks. The quality of the beverage in such a large container will gradually deteriorate, with the result that a substantial portion of the beverage will become unpalatable if the beverage is not consumed after a short period of time. In particular, contact with air can cause the product to become stale due to oxidation; air can dissolve into the beverage and alter the product's taste and mouthfeel; and contaminants such as mold, moisture, microorganisms, and dust can spoil the product. Moreover, the flavor of carbonated beverages, which contain dissolved carbon dioxide gas ($CO_2$), can turn flat from a loss of carbonation over time. All of these issues can be mitigated by resealing the beverage container after use. However, because of the relatively large volume of some beverage containers, air will remain in the headspace within the container, with the result that the flavor of the remaining beverage is impaired.

One possible solution to this problem is to pump pressurized $CO_2$ into the headspace of the opened beverage container prior to resealing. However, doing so would require expensive and impractical equipment and the process may not be entirely effective. Other solutions, such as inserting an inflatable bladder into a bottle to separate the headspace from the liquid (see, e.g., U.S. Patent Publication No. 2011/0278297) may also be inadequate, because such inflatable bladders tend to leak gases and liquids over time. Thus, an effective and practical solution is still desired.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages for sealing beverage containers.

In one embodiment, a beverage container cap is provided for resealing a beverage container. The beverage container cap comprises a cap member having an interior side for sealingly coupling with an opening of the beverage container. The cap member defines a pathway for selectively communicating gas through the cap member. The beverage container cap further comprises an inflatable member configured to couple to the cap member and to expand in volume upon receiving gas from the pathway. The inflatable member includes a first layer for capturing gas received by the inflatable member, thereby inflating. The inflatable member further includes a second layer operatively coupled to the first layer such that the second layer expands upon the first layer inflating. The first layer and second layer are unattached to each other at one or more areas to allow the second layer to expand or contract relative to the first layer.

In another embodiment, a method is provided for removing a headspace of a beverage container. The method comprises inserting an inflatable member inside the beverage container. The inflatable member includes first and second layers, wherein the first layer is configured to inflate, and the second layer is configured to expand upon the first layer inflating. The first layer and second layer are sufficiently independent of one another to allow the second layer to expand or contract relative to the first layer. The method further comprises expanding the inflatable member inside the beverage container by inflating the first layer and thereby expanding the second layer. The method further comprises sealing liquid inside the beverage container while the inflatable member is inside the beverage container.

In yet another embodiment, a carrier sub-assembly is provided. The carrier sub-assembly comprises a membrane carrier defining first and second apertures. The first and second apertures are fluidly coupled by a pathway. The carrier sub-assembly further comprises a coupling for sealing the membrane carrier to a cap member about the first aperture such that gas provided from the cap member is received by the first aperture and passed along the pathway to the second aperture. The carrier sub-assembly further comprises an inflatable member operatively coupled to the membrane carrier. The inflatable member has an open end sealed about the second aperture for expanding in volume upon receiving gas from the second aperture via the pathway. The inflatable member includes a first layer and a second layer. The first layer is configured to inflate in response to increased pressure from gas received from the second aperture. The second layer is operatively coupled to the first layer such that the second layer expands as the first layer inflates. The first layer and second layer are unattached to each other at one or more areas to allow the second layer to expand or contract relative to the first layer.

In yet another embodiment, an elastic, fluid-impermeable bladder is provided. The elastic, fluid-impermeable bladder comprises a fluid impermeable balloon and an elastic balloon. The elastic balloon is operatively coupled to the fluid impermeable balloon such that when the fluid impermeable balloon is inflated it expands the elastic balloon. The fluid impermeable balloon is more fluidly impermeable than the elastic balloon. The elastic balloon is more elastic than the fluid impermeable balloon.

In yet another embodiment, an assembly of a beverage cap is provided. The assembly comprises a cap member. The cap member includes a first coupling interface for engaging the cap member to a bottle top, and a second coupling interface for engaging of the cap member to a carrier sub-assembly. The assembly further comprises a piston extending from a handle end to a crown end. The piston is disposed through the cap member. The piston includes an actuator member slidably disposed longitudinally through the piston. The actuator member extends from the handle end of the piston to an actuator end. The actuator end of the actuator member is operatively extendable out from the crown end of the piston to release a pump valve. The piston further includes a piston seal disposed about a perimeter of the piston for creating a seal with a surrounding wall for pumping.

In yet another embodiment, a method is provided for generating a look-up table. The method comprises generating an entry of the look-up table. The entry has data corresponding to a first beverage type, a first temperature, and a pressure of the beverage type at the first temperature. Generating the entry includes bringing an unopened bottle of the first beverage type to the first temperature, measuring pressure inside the unopened bottle at the first temperature, and recording the measured pressure and the first temperature in the look-up table. The method further comprises repeating the generating to generate additional entries of the look-up table.

DETAILED DESCRIPTION OF EMBODIMENTS

Figure 1A:
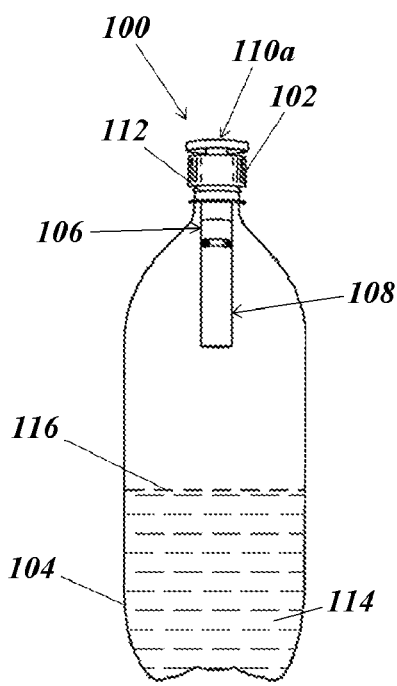
FIGS. 1A-1D show illustrative schematic diagrams of a cap assembly having an inflatable member positioned within a beverage container at various stages of inflation according to one embodiment.

Before embodiments are described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

Reference to a singular item includes the possibility that there are plural of the same items present. More specifically, as used herein and in the appended claims, the singular forms "a," "an," "said" and "the" include plural referents unless the context clearly dictates otherwise.

Embodiments of the disclosure relate to systems and methods for sealing a container and reducing the headspace of the container. Embodiments are particularly useful for application to liquid (e.g., beverage) containers. For example, one embodiment includes a screw-on bottle cap that has a double-layer balloon for inflating inside a partially-filled bottle to occupy volume of the headspace inside the bottle. The double-layer balloon includes an inner barrier layer that prevents gases such as air from passing through the balloon and an outer elastic layer that expands and contracts upon inflation and deflation. During operation of one embodiment, the bottle cap is placed on the bottle top, and a hand pump inflates the balloon inside the bottle to displace the headspace volume of the bottle. For example, air is pumped into the inner barrier layer, causing it to inflate inside the outer elastic layer. In turn, the outer elastic layer expands and thus the balloon expands. As the balloon expands, it takes up additional space within the bottle, which forces air from the headspace out of the bottle through a vent. In one embodiment, the vent is a space between the bottle cap and the bottle top where the bottle cap is loosely connected to the bottle opening (e.g., loosely screwed on). Once a desired amount of air is removed from inside the bottle, the bottle cap can be sealed (e.g., tightly screwed on) over the bottle opening. As a result, little or no air is left in the bottle, because air from the headspace has been mostly or fully displaced, and because the inner barrier layer prevents air from inside the balloon from contacting the liquid stored in the bottle. To dispense a serving from the bottle, the air inside the bottle can be vented to deflate the balloon. In doing so, the elastic force of the outer elastic layer shrinks the balloon so that, for example, the balloon returns nearly to its original shape and then can be removed from the bottle.

Furthermore, some embodiments of the disclosure relate to systems and methods for pressurizing a container that has been previously opened. For example, one embodiment includes the bottle cap as described above that is configured to pressurize the inside of the bottle after the air has been removed and the bottle has been sealed. For example, after purging the air and sealing the bottle, the pump can be used to pressurize the balloon to increase the internal pressure of the bottle. In one embodiment, the bottle cap includes a pressure gauge to provide an indication of the internal pressure of the bottle for inflating the balloon to a desired pressure level. For example, the bottle can be pressurized until the internal pressure reaches about the original pressure of the bottle before it was opened. For example, for carbonated beverages, once pressurized, the carbonation level can be preserved for a substantial period of time.

To further illustrate, FIGS. 1A-1D show example diagrams of a cap assembly 100 having a cap member 102 for coupling with a beverage container 104 and a carrier sub-assembly 106 positioned within the beverage container 104 at various stages of inflation according to one embodiment. In particular, an interior side of the cap member 102 can couple to an exterior portion of the beverage container 104 such that the cap member 102 covers the opening of the beverage container. In other arrangements, the cap member could include expanding features to seal with the interior of a bottleneck.

The carrier sub-assembly 106 includes an inflatable member 108 (also referred to as a double-walled balloon or a double layer balloon herein) to reduce headspace in the beverage container 104, purge gas out of the beverage container 104, and/or to pressurize the contents of the beverage container 104. To provide gas for inflation, the cap member 102 is coupled to a gas input interface, such as a piston sub-assembly 110a for the illustrated embodiment. In particular, the cap member 102 has a pathway for gas for inflation that goes through the cap member 102 from the exterior side (for example, from the piston sub-assembly 110a) to the interior side (for example, to the inflatable member 108). The inflatable member 108 has an open end for fluidly sealing the interior end of the pathway, for example around the carrier sub-assembly 106. The inflatable member 108 can expand in volume upon receiving gas from the pathway. In other arrangements, the gas input interface may comprise, for example, an interface for receiving a conventional pump interface, such as an internally threaded bicycle pump hose, or a needle used for pumping basketballs.

With reference to FIG. 1A, the cap assembly 100 is placed onto a bottleneck 112 of the beverage container 104 after the beverage container has been opened at least once and still contains liquid 114. At this point there is substantial air in the beverage container. As stated, certain gases can adversely affect the liquid over time. For example, carbonation levels can lessen with time as $CO_2$, for example, evolves from the surface 116 of the liquid 114. Similarly, juices, wines, and milk can be affected by prolonged exposure to air.

Figure 1B:
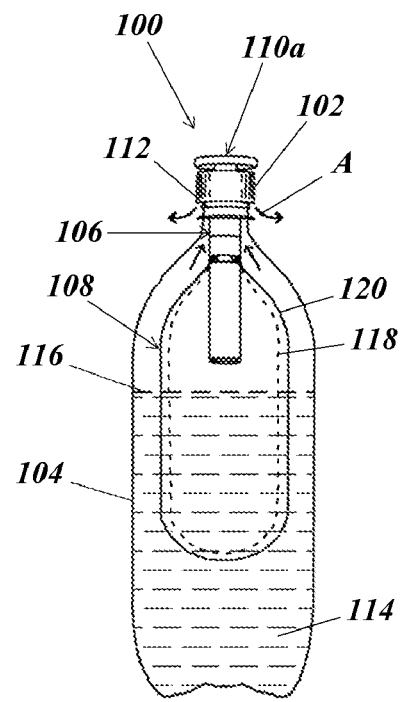

Now turning to FIG. 1B, the piston sub-assembly 110a is activated to inflate or enlarge the inflatable member 108 and to reduce or eliminate the headspace within the beverage container 104. In operation, as the inflatable member 108 increases in volume, the headspace within the beverage container 104 is reduced or eliminated and air escapes through a fluid path between the headspace and the external environs. In particular, the embodiment of FIG. 1B has a fluid path A that is formed between the cap member 102 and the bottleneck 112 by loosely screwing the cap member 102 onto the bottleneck 112. As such, displaced gas can escape along fluid path A. For instance, the inflatable member 108 can displace gas directly by expanding into the headroom space, and indirectly by expanding into the liquid 114 and causing the surface 116 to rise toward the top of the beverage container 104. In other arrangements, the fluid path for displaced air can be provided through a sealed cap, e.g., by way of a manually operated vent.

The inflatable member 108 may take a wide variety of forms and/or shapes including but not limited to balloons, bladders, envelopes, films, tubes, bags, and membranes. The shape of the inflatable member 108 is designed to fit within the beverage container 104. In one embodiment the volume of the inflatable member can expand to at least 50% of the volume of the interior of the beverage container 104. In some embodiments, the volume of the inflatable member 108 is capable of expanding (without bursting) to a volume that matches or exceeds the volume of the beverage container 104 by about 5% to about 25%.

The inflatable member 108 shown in FIG. 1B is formed by an inner barrier layer 118 and an outer elastic layer 120. The inner barrier layer 118 and the outer elastic layer 120 may take a wide variety of forms and/or shapes including but not limited to balloons, bladders, envelopes, films, tubes, bags, and membranes. In some embodiments, the inner barrier layer 118 and the outer elastic layer 120 have the same form and/or shape. In other embodiments, the inner barrier layer 118 and the outer elastic layer 120 have different forms and/or shapes. For example, the inner barrier layer 118 may have a rectangular shape, whereas the outer elastic layer 120 may inflate into a predetermined shape (for example, the shape of beverage container). Accordingly, the inflatable member 108 may take on the predetermined shape by virtue of the outer elastic layer 120 constraining the expansion of the inner barrier layer 118.

The inner barrier layer 118 can be a fluid impermeable structure which serves to separate the air inside the inner barrier layer 118 from the contents of the container. For example, the inner barrier layer 118 may inhibit (1) $CO_2$, water, and other like fluids from entering the confined interior space of the inflatable member 108; and (2) air and moisture of the confined interior space of the inflatable member 108 from entering the liquid 114. In some embodiments, the inner barrier layer 118 is made of a food-grade material which will not affect the beverage's flavor or promote spoilage. In some embodiments, the inner barrier layer 118 is non-toxic and/or hypoallergenic so as to avoid toxicity and/or allergic reactions. A non-limiting example of a suitable material for the inner barrier layer 118 is polyvinylidene chloride. Other examples include ethylene vinyl alcohol, nylon, and polyvinyl alcohol.

An example of a fluid impermeable material is a material having a water vapor transmission between 0 and 20 grams·0.001 inches/100 square inches·day·atmosphere at 73° Fahrenheit (g·mil/100 in$^2$·24 hr·atm@73 F), an oxygen transmission rate between about 0 and 20 cubed centimeters·0.001 inches/100 square inches·day atmosphere at 73° Fahrenheit 0 percent relative humidity (cm$^3$·mil/100 in$^2$·24 hr·atm@73 F, 0% RH), a carbon dioxide transmission rate between about 0 and 80 cm$^3$·mil/100 in$^2$·24 hr·atm@73 F, 0% RH, and/or a nitrogen transmission rate between about 0 and 20 cm$^3$·mil/100 in$^2$·24 hr·atm@73 F, 0% RH. More particularly, the transmission rates for all of water, oxygen, carbon dioxide and nitrogen can be between 0 and about 20 cm$^3$·mil/100 in$^2$·24 hr·atm@73 F, 0% RH. It will be appreciated, however, that other applicable ranges can be selected. For example, in some embodiments, the transmission rate for oxygen can be about 0 to 200 cm$^3$·mil/100 in$^2$·24 hr·atm@73 F, 0% RH. In another embodiment, the transmission rate for oxygen can be about 0 to 100 cm$^3$·mil/100 in$^2$·24 hr·atm@73 F, 0% RH. In yet another embodiment, the transmission rate for oxygen can be about 0 to 1.25 cm$^3$·mil/100 in$^2$·24 hr·atm@73 F, 0% RH. The exemplary fluid impermeable material of polyvinylidene chloride has a water vapor transmission rate of about 0.47 cm$^3$·mil/100 in$^2$·24 hr·atm@100 F, and an oxygen transmission rate of about 0.94 cm$^3$·mil/100 in$^2$·24 hr·atm @73 F, 0% RH.

While the inner barrier layer 118 may comprise a single type of material (e.g., polyvinylidene chloride), it will be appreciated that the inner barrier layer 118 is not limited to comprising a single type of material. For example, the inner barrier layer 118 may be a composite structure formed from two or more types of materials such that the composite structure possesses one or more of the above-described characteristics. Examples of composite structures of the inner barrier layer 118 include structures having coextruded sub-layers, coatings, composite polymers, and the like. For example, the inner barrier layer 118 can comprise one or more sub-layers of polyvinylidene chloride, ethylene vinyl alcohol, nylon, and/or polyvinyl alcohol, coupled by adhesive. Multiple layers can improve fluid impermeability both by providing different materials for excluding different types of fluids and by providing secondary containment of any pinhole or leakage paths through one layer that are likely to be misaligned with any pinhole or leakage paths of adjacent layers.

The outer elastic layer 120 can be made of an elastomeric material that returns to a low profile shape when deflated. The outer elastic layer 120 can define the shape of the inflatable member 108 as the inner barrier layer 118 inflates and/or deflates. In some embodiments, the outer elastic layer 120 has a tensile modulus at 100% (e.g., a force or stress that produces 100% elongation or strain; can also be referred to as M100 or 100% modulus) of about 0 and 20 megapascals (MPa). It will be appreciated that the outer elastic layer 120 may have a tensile modulus selected from other applicable ranges, such as between about 0 and 10 MPa or between about 0.5 to 0.8 MPa. In some embodiments, the outer elastic layer 120 has an elongation at break in the range from about 200% to about 1200%. In some embodiments, the outer elastic layer 120 has an elongation at break of about 700% to about 900%. In some embodiments, the outer elastic layer 120 is made of a food-grade material which will not affect the beverage's flavor or promote spoilage. In some embodiments, the outer elastic layer 120 is non-toxic and/or hypoallergenic so as to avoid toxicity and/or allergic reactions in users. A non-limiting example of a suitable material for an outer elastic layer 120 is natural latex rubber. Other examples include Vytex™ natural rubber, Yulex™ natural rubber, and synthetic rubber.

While the outer elastic layer 120 may be formed of a single type of material (e.g., natural latex rubber), it will be appreciated that the outer elastic layer 120 is not limited to a single type of material. For example, the outer elastic layer 120 may be a composite structure formed from two or more types of materials such that the composite structure possesses one or more of the above-described characteristics. Examples of composite structures of the outer elastic layer 120 include structures having coextruded sub-layers, coatings, composite polymers, and the like. For example, the outer elastic layer 120 can comprise one or more sub-layers of natural latex rubber, Vytex™ natural rubber, Yulex™ natural rubber, and/or synthetic rubber that could be coupled by adhesive.

While the barrier layer 118 and the elastic layer 120 are operatively coupled such that the elastic layer 120 expands upon the barrier layer 118 inflating, the barrier layer 118 and the elastic layer 120 are unattached (e.g., not fixedly connected) at one or more areas or locations. As such, the elastic layer 120 can expand or contract relative to the barrier layer 118. For example, the barrier layer 118 and the elastic layer 120 may be coupled to each other about their respective openings and nowhere else, as shown in FIG. 1B. As described below, the elastic layer 120 may additionally or alternatively be coupled to the barrier layer 118 at other discrete locations. The unattached areas of the elastic layer 120 can expand, contract, and otherwise move without the inner barrier layer 118 expanding, contracting, or otherwise moving.

In some embodiments, the barrier layer 118 and the elastic layer 120 define a gap therebetween. The gap may include a food-grade lubricant such as glycerin, propylene glycol, silicone grease, talc, or the like to aid the expansion and contraction of the barrier layer 118 within the elastic layer 120 and to prevent tears and/or ruptures of either layer 118 or 120. As stated, the barrier layer 118 and elastic layer 120 may serve as a first balloon within a separate second balloon, with lubricant therebetween, as in the illustrated embodiment.

One advantage, among others, of the double-layer inflatable member 108 described herein is that the inner barrier layer 118 separates the incoming air for pressurizing from the liquid 114 and facilitates purging the unconfined headspace. Accordingly, the liquid 114 of the beverage container 104 can have less contact with air—which may contain contaminants like dust, mold, and microorganisms. Thus, some embodiments of the cap assembly 100 preserve freshness and slow spoilage and oxidation. Similarly, for carbonated beverages, minimizing headspace with a fluid impermeable barrier, whether the remaining headspace is pressurized or not, reduces $CO_2$ evolution from solution.

After relieving the pressure from the inflatable member 108, the outer elastic layer 120 compacts the inner barrier layer 118 and facilitates easy insertion and removal of the device through a narrow opening or bottleneck 112.

In one embodiment, the inner barrier layer 118 is a non-elastic/semi-elastic envelope. An example of a non-elastic/semi-elastic material is a material having a Young's modulus of elasticity of greater than about 50 MPa. The exemplary inner barrier layer material of polyvinylidene chloride has a Young's modulus of elasticity of about 340 to 550 MPa. Such envelopes can be durable, long-lasting, and/or do not impart odors or flavors to stored fluids. The inner barrier layer 118, when fully inflated, may have dimensions larger than the intended container in order to avoid ruptures.

In another embodiment, the outer elastic layer 120 is a permeable/semi-permeable envelope. An example of a permeable/semi-permeable material is a material having a water vapor transmission rate greater than about 500 g·mil/100 in$^2$·24 hr·atm@77 F, and an oxygen transmission rate greater than about 1000 cm$^3$·mil/100 in$^2$·24 hr·atm@73 F, 0% RH. The exemplary outer elastic layer material of natural latex rubber has a water vapor transmission rate of about 2000 to 2500 g·mil/100 in$^2$·24 hr·atm@77 F, and an oxygen transmission rate of about 4000 to 4700 cm$^3$·mil/100 in$^2$·24 hr·atm@73 F, 0% RH. Such envelopes have long lifespans with respect to repeated inflations. The outer elastic layer 120, when fully deflated, may have dimensions smaller than the opening of the intended container in order to facilitate insertion into and removal from the beverage container.

The illustrated inflatable member 108 is thus a composite structure made of a set of materials providing elasticity and fluid impermeability. The outer elastic layer 120 may have the form of a closed-ended envelope, an open coil, braid, cage, or net. For example, the outer elastic layer 120 may comprise one or more band structures (e.g., a net) each surrounding a portion of a perimeter of the inner barrier layer 118. The elastic properties of each band can be selected to affect the shape of the inflated inflatable member 108. The outer elastic layer 120 may surround the inner barrier layer 118, and may be attached or separate from the inner barrier layer 118.

In yet another embodiment (not shown), the elastic layer 120 can be on the inside of the fluid impermeable barrier layer 118. In such an embodiment, the fluid impermeable barrier layer 118 may be bonded, tacked, or partially attached to the elastic layer 120 such that it will retract when intended.

Figure 1C:
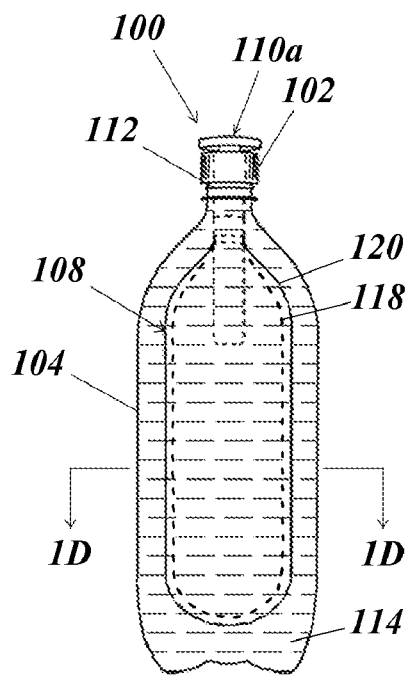

As shown in FIG. 1C, the pumping action can be continued until the headspace in beverage container 104 is mostly or almost entirely eliminated. For example, FIG. 1C shows that the surface 116 of the liquid 114 approximately reaches the bottleneck 112 and there is no visible headspace. In one embodiment, the inflatable member 108 is capable of being reversibly enlarged sufficiently to substantially fill the beverage container 104. Being able to do so may be advantageous for using the cap assembly 100 to eliminate the headspace of the beverage container 104 when the beverage container 104 has a small amount of liquid 114.

After the inflatable member 108 is inflated and the headspace is reduced as shown in FIG. 1C, the fluid path A formed between the container volume (outside the inflatable member 108 (e.g., through the cap member, or between a loosely adhered cap member 102 and the bottleneck 112)) can be closed. For example, in the embodiment shown in FIGS. 1A-1D, the cap assembly 100 is completely tightened on bottleneck 112, thus blocking the fluid path A and forming a fluid-tight seal.

Furthermore, once headspace has been reduced by inflation of the inflatable member 108 and the cap assembly 100 is sealed, in some embodiments the piston sub-assembly 110a can be pumped until a desired internal pressure is reached. As described below in connection with FIGS. 3A and 3B, for example, a pressure gauge 302 may be incorporated into the cap member 102 that displays an indication of the pressure within the beverage container 104 and/or the inflatable member 108.

Figure 1D:
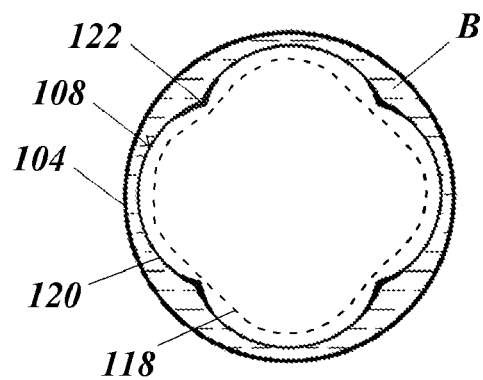

Turning to FIG. 1D, the inflatable member 108 in certain embodiments may contain one or more pleats, grooves, or other structural elements to form or maintain one or more longitudinal flow channels B in the inflated condition. The inflatable member 108 shown in FIG. 1D includes four pleats or grooves 122 to define four longitudinal flow channels B. However, the shape and number of the flow channels B may vary and the inflatable member 108 may take other shapes (as described herein). These longitudinal flow channels B serve to ensure flow of fluid and to prevent an inadvertent stoppage or pocket to be formed, preventing venting of the headspace. Such inflated shapes can be achieved, for example, by providing a non-uniform thickness, varying materials, weakened or discrete areas of reduced thickness, coatings, bands or shells, etc. to the outer elastic layer 120 to selectively inhibit expansion of some regions relative to other regions. Similar variation in the outer elastic layer 120 can control the shape of the inflatable member 108 in the vertical dimension as well. However, in other embodiments, the inflatable member 108 is smooth (i.e., is not textured, ridged, or pleated).

FIGS. 2A-2D show illustrative cap assemblies 100a, 100b, 100c, 100d for sealing beverage containers according to various embodiments. Elements common to the cap assemblies 100a, 100b, 100c, 100d of FIGS. 2A-2D share common reference indicia, and only differences between the cap assemblies 100a, 100b, 100c, 100d are described herein for the sake of brevity.

Figure 2A:
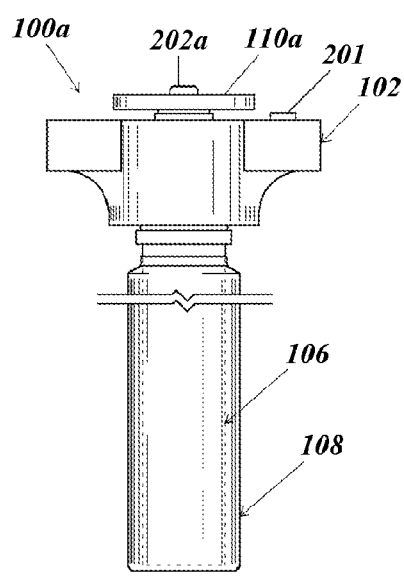
FIGS. 2A-2D show illustrative cap assemblies for sealing beverage containers according to various embodiments.

FIG. 2A shows one embodiment of a cap assembly 100a that includes a cap member 102, a carrier sub-assembly 106 with an inflatable member 108, and a gas input interface in the form of a pump sub-assembly 110a. For example, the cap assembly 100a can have a cap member 102 that can be selectively sealed (e.g., screwed) on to a bottle top, and be used for both carbonated and un-carbonated liquids. Furthermore, the cap assembly 100a shown in FIG. 2A further includes a pressure relief button 201 and an actuator member 202a. In operation, when the pressure relief button 201 is pressed, negative or positive pressure inside the beverage container (remaining headspace) is vented so that the pressure inside the beverage container is equalized with the pressure outside the beverage container (for example, the ambient room pressure). When the actuator member 202a is pressed, pressure inside the inflatable member 108 is equalized with the pressure outside the beverage container. Various aspects of the cap assembly 100a will be discussed in detail in connection with FIGS. 4-7B.

In order to remove the cap assembly 100a and dispense the beverage contained in the bottle, the pressure within the bottle can be released using the actuator member 202a housed within the piston sub-assembly 110a to bleed air out of the inflatable member 108. Doing so can create a vacuum within the bottle, so that pressure relief button 201 can be pressed to release the vacuum prior to opening the bottle. For embodiments without a pressure relief valve, a fluid path A (FIG. 1B) can be restored by loosening the cap member 102 from the bottleneck 112. Breaking the vacuum allows the unconfined headspace to reform, while further releasing the air by engaging the actuator member 202a returns the inflatable member 108 to its low volume shape. The pressure relief button 201 and actuator member 202a can be engaged alternately or together. The cap assembly 100a can then be removed and the beverage may be dispensed normally.

Figure 2B:
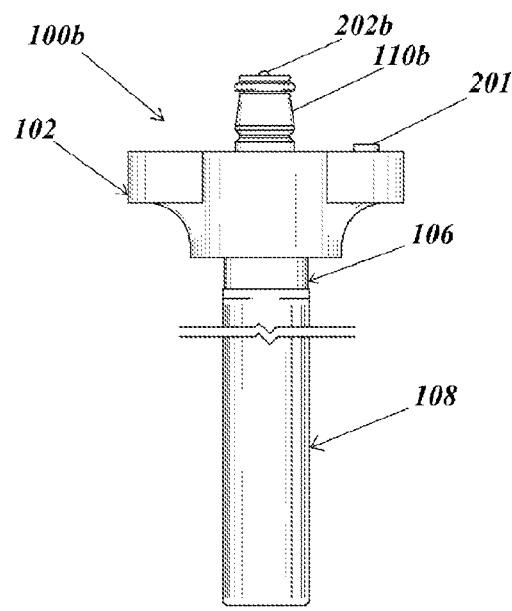

FIG. 2B shows another embodiment of a cap assembly 100b including a gas input interface in the form of a gas valve 110b having a gas input valve actuator member 202b, such as a poppet. As shown in FIG. 2B, the cap assembly 100b can operate with an external gas supply for inflating the inflatable member 108. For example, a $CO_2$ supply or a separate hand pump can be coupled to the gas valve 110b, whereby the actuator member 202b is pressed downward to open the gas valve 110b. With the gas valve 110b open, gas can communicate between the gas supply and the interior of the inflatable member 108, for inflating or deflating the inflatable member 108.

Figure 2C:
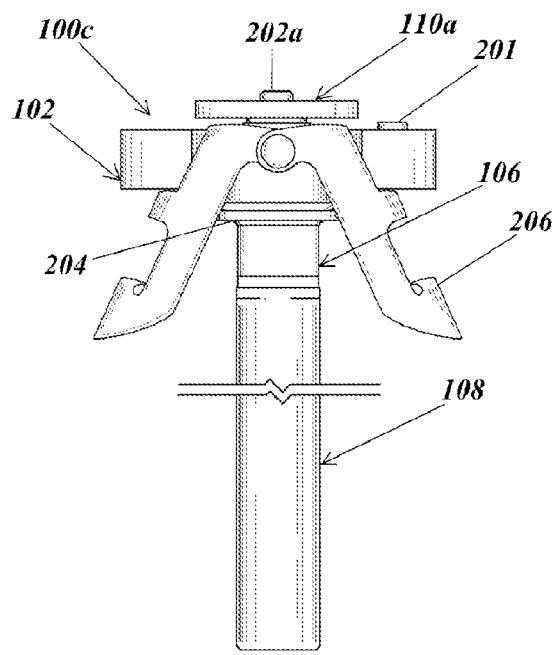

FIG. 2C shows yet another embodiment of a cap assembly 100c including a seal 204 and a quick release latch 206. In operation, the cap assembly 100c is placed onto a bottle top of a beverage container, such as the top of a wine bottle, and the levers of the quick release latch 206 are rotated down towards the container to secure the cap assembly 100c tightly to the beverage container. When the quick release latch 206 is closed, the seal 204 creates a tight seal between the cap assembly 100c and the beverage container. The quick release latch 206 can be opened by swinging the levers up and away from the container.

Figure 2D:
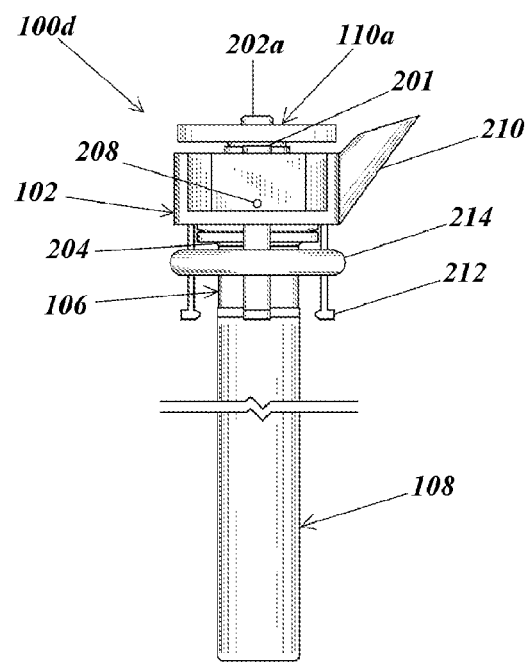

FIG. 2D shows yet another embodiment of a cap assembly 100d including a pressure relief port 208, a faucet or spout 210, a latch 212, and a latch lock 214. The pressure relief port 208 provides an output for gas to escape from inside the beverage container (e.g., remaining headspace) upon inflation of the inflatable member 108, or for gas to enter the container upon deflation and/or pouring.

The spout 210 provides an output port for dispensing the liquid contents of the beverage container without disengaging the cap member 102 from the beverage container. In operation, a first opening (not shown) of the spout 210 can be opened and the liquid can be poured out of the first opening. In some embodiments, the inflatable member 108 can be further inflated to create enough pressure in the container to force its liquid contents out of the faucet or spout 210. In one embodiment, a stand can be provided for the beverage container to allow for inverted or horizontal storage of the container simplifying the dispensing of the liquid content of the beverage container. After dispensing, the contents can be repressurized. It will be appreciated that the pressure relief port 208 may be part of the spout 210. For example, one structure can be used for venting the bottle and for dispensing the beverage of the bottle.

In some embodiments, the spout 210 may have a second opening (e.g., a small opening through the wall of the spout 210; not shown) for aerating the beverage as it is being dispensed. For example, the spout 210 can be used to aerate red wine as it is being poured. This second opening may be opened independently of the first opening, or can be open at all times but positioned downstream of the manual opening for pressurized liquid dispensation to the spout 210. Fluid flow past the second opening can draw air into the flowing fluid by the Venturi effect.

The latch 212 engages the top of a bottle, such as a wine bottle having a protruding lip around a perimeter about the bottle top. The latch lock 214 prevents the latch 212 from disengaging from the bottle top while the latch lock 214 is engaged. For example, the cap assembly 100d engages a wine bottle by coupling the latch 212 to the bottle top of the wine bottle, where the distal end of the latch 212 is positioned just below a lip of the bottle top. By sliding the latch lock 214 downward to the distal end of the latch 212, the latch lock 214 tightens the coupling of the latch 212 with the bottle top and/or prevents the latch 212 from flexing over the lip and becoming disengaged with the bottle top.

It will be appreciated that various embodiments of the cap assembly 100 can be provided as an integrated cap member 102 and piston sub-assembly 110a, and a separate disposable carrier sub-assembly 106 cartridge including an inflatable member 108 that can be mounted to the cap member 102, and/or a plurality of user affixable inflatable members 108 of the same shape or of different shapes corresponding to different containers or applications (e.g., without limitation, 1, 2, and 3 L bottles).

As stated in connection with FIGS. 2A-2D, in various embodiments the cap assembly 100 can be attached to bottles containing liquids such as beverages in order to preserve freshness and/or preserve any carbonation. Additional applications include containers of metal, glass, or other materials by various coupling mechanisms. For example, the cap assembly 100 can be configured to attach to containers without threaded openings and employ an alternative system such as a clamp, latch, or compression seal, as discussed with respect to FIGS. 2C and 2D. It will be appreciated that a cap assembly 100 could be modified for use with a reusable beer growler or for use with a bottle for non-carbonated wines, sparkling wines, or champagne. Moreover, cap assemblies including both fluid impermeable and elastic layers can be adapted for use with containers that do not resemble bottles. Furthermore, non-liquid material can be stored in the container and still benefit from the reduced exposure to air from employing the impermeable layer in the inflatable member.

Particular embodiments of the cap assembly 100 may be specifically designed to operate with certain bottle types, beverage types, carbonations levels, and other like aspects of the beverage and/or beverage container. As such, the cap assembly 100 may have an indicator, such as color, to indicate a use of the particular cap assembly 100. For example, a burgundy colored cap assembly 100 may be particularly adapted to couple with wine bottles. Additionally or alternatively, the indicator may assist the user in managing the use of a particular cap assembly 100. For example, brown and purple cap assemblies 100 may be identically adapted for use with two liter soda bottles. Here, the color of the cap assembly 100 can help the user distinguish a cap assembly 100 (for example, a brown cap assembly 100) that the user normally uses with cola-type sodas from a cap assembly 100 (for example, a purple cap assembly 100) that the user normally uses with grape-flavored sodas. One advantage, among others, of an indicator system is that unintended alterations to the flavor of the stored beverage can be avoided.

Figure 3A:
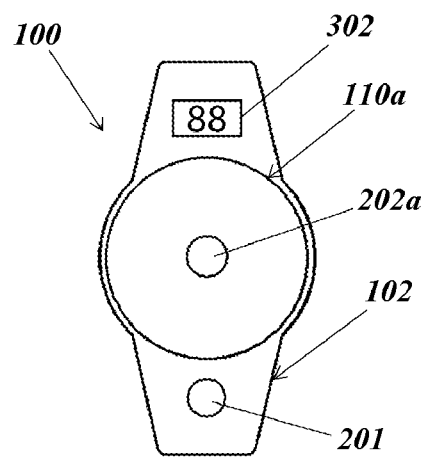
FIGS. 3A and 3B show a top view and a perspective view, respectively, of the cap assembly of FIG. 2A, incorporating a pump, pressure gauge, and pressure relief valve, according to one embodiment.
Figure 3B:
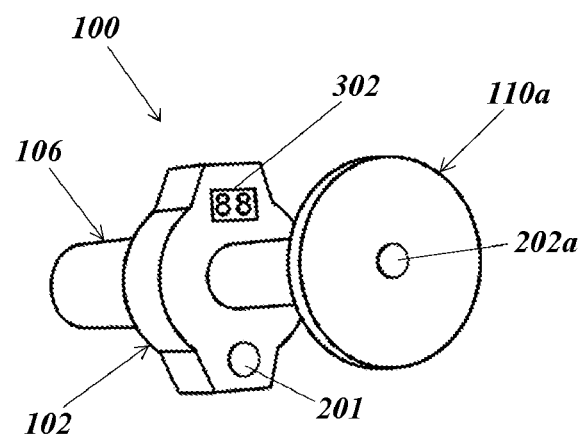

Now turning to FIGS. 3A and 3B, a top view and a perspective view, respectively, of the cap assembly 100a of FIG. 2A is shown, according to one embodiment. FIGS. 3A and 3B illustrate a pressure gauge 302 on top of the cap member 102. The pressure gauge 302 indicates an internal pressure of the beverage container and/or the inflatable member 108. The indication of the internal pressure can be used to achieve a desired pressure. For example, for a carbonated beverage to maintain carbonation levels at 30%-80% or more of the original carbonation levels, a particular storage pressure range within the container can be experimentally determined. In one embodiment, the value of the desired pressure can be determined from a beverage headspace pressure table—for example, a look-up table of actual equilibrium headspace pressures measured in unopened bottles, as provided by the manufacture, of popular beverage brands at selected refrigerated and unrefrigerated temperatures. On example beverage headspace pressure table is shown below in Table 1. The beverage headspace pressure table shown in Table 1 is merely an example, and other beverage types, brands, and temperatures may be included. A process for generating a beverage headspace pressure table is described below with reference to FIG. 9.

TABLE 1

| Brand | Temperature (Fahrenheit) | Pressure (PSI) |
| --- | --- | --- |
| Cola Brand 1 | 36.5 | 24.2 |
| Cola Brand 2 | 41 | 27 |
| Soda Brand 3 | 42 | 21 |
| Soda Brand 4 | 42 | 30.5 |

In one embodiment, the beverage headspace pressure table can be printed on a sheet of paper or stored on a computer-readable medium. A user can look up the pressure reading of the beverage type and match it to the pressure gauge 302 reading while pressurizing the container. Consequently, the desired pressure can be determined accurately for a given temperature and a beverage type.

The beverage headspace pressure table can include a pressure modifier to compensate for internal pressure changes during refrigeration and/or various refrigerator temperatures. After resealing and pressurizing a bottle to the corresponding equilibrium pressure by using the cap assembly 100, the bottle and attached cap assembly 100 can be returned to the refrigerator. Some of the $CO_2$ that had evolved after the cap assembly 100 is sealed (e.g., screwed tight) and the bottle pressurized can dissolve back into solution as the bottle is stored in a refrigerator and the $CO_2$ reaches equilibrium at the refrigerated temperature.

Furthermore, in some embodiments a temperature gauge (not shown) can be integrated to automatically compensate for different environment temperatures. As the container content's temperature increases, so does the pressure within the inflatable member 108 that will keep the same levels of $CO_2$ in solution. In one embodiment, the cap assembly 100 can have one or more such predetermined values (such as pressures corresponding to points in a typical temperature range) printed or otherwise affixed to it, such that the user can look up the pressure reading of the brand of beverage and match it to the pressure gauge 302 reading while pressurizing the container. Consequently, the desired pressure can be determined accurately for a given temperature and a specific beverage.

It will be appreciated that the above pressure compensation system could be adapted to soda, beer, sparkling wines, champagne, or any carbonated liquid, for example, by tabulating empirical pressure data based on carbonation levels and temperatures. It will also be appreciated that the pressure gauge 302 and process of pressurizing can be omitted where headspace reduction is the primary goal for minimizing interaction with air in the bottle.

Figure 4:
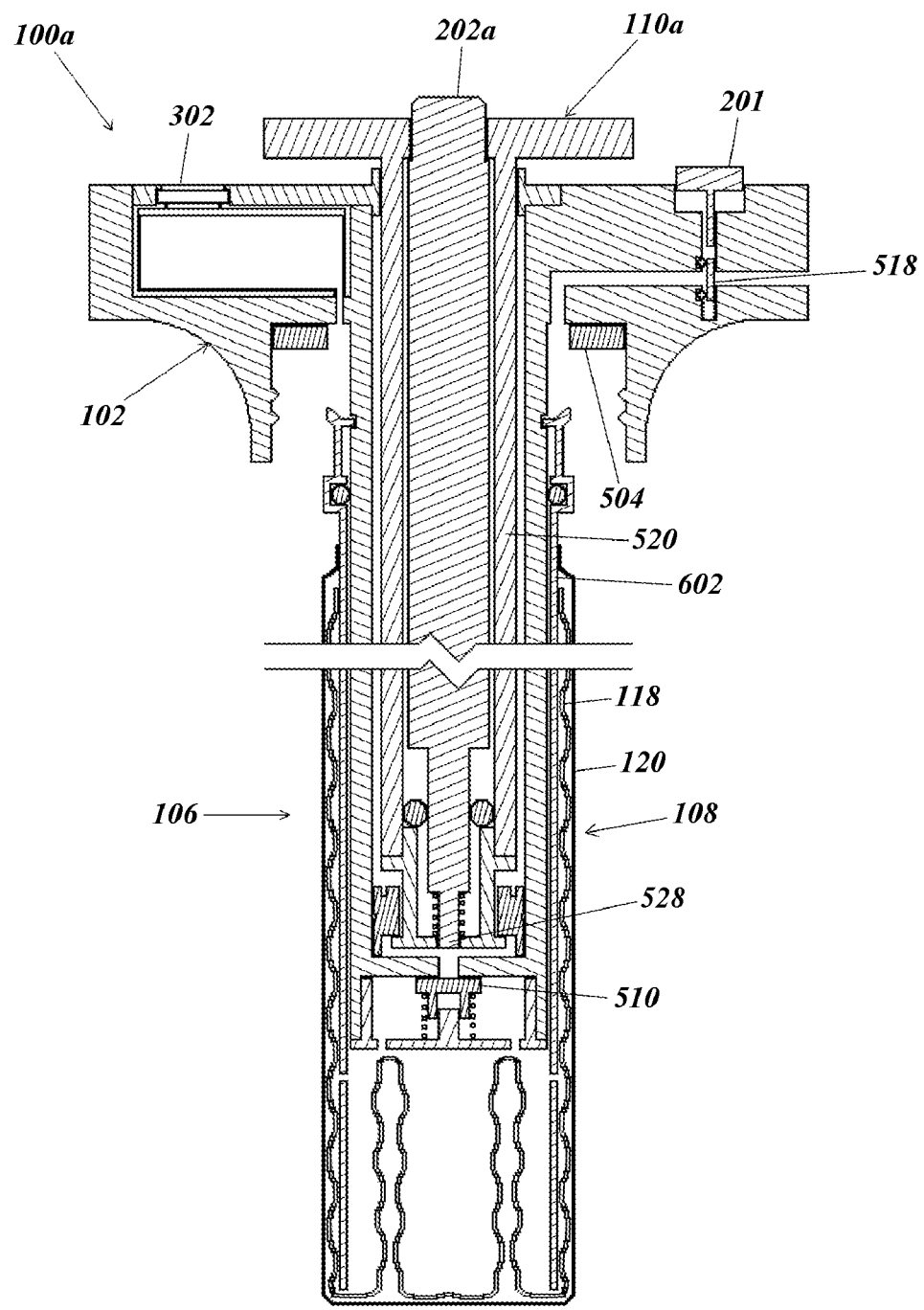
FIG. 4 shows a cross-sectional view of the cap assembly of FIG. 2A, according to one embodiment.

FIG. 4 shows a cross-sectional view of the cap assembly 100a of FIG. 2A, according to one embodiment. In particular, FIG. 4 shows a detailed partial cross section of a cap assembly 100a including the cap member 102, the carrier sub-assembly 106, and the piston sub-assembly 110a. While FIG. 4 includes additional referenced components of the cap assembly 100a, these components will be discussed below in connection with FIGS. 5-6B.

Although the cap assembly 100a of FIG. 2A is shown as one assembled apparatus, it will be appreciated that each of the individual components of the cap assembly 100a may be detachable in various embodiments. For example, in one embodiment, at least the cap member 102, the carrier sub-assembly 106, and the piston sub-assembly 110a are each individually detachable, and each will be discussed in further detail below with reference to FIGS. 5A, 5B, 6A, and 6B. In one embodiment, the carrier sub-assembly 106 may be a replaceable or disposable part, whereas the cap member 102 and the piston sub-assembly 110a form a cap-piston sub-assembly which may have a longer lifespan than the carrier sub-assembly 106. However, it will be appreciated that the cap assembly 100a can alternatively be one integrated device without detachable or replaceable parts, according to some embodiments.

As shown in FIG. 4, the inflatable member 108 in the deflated condition collapses upon a membrane carrier 602 of the carrier sub-assembly 106. The outer elastic layer 120 contracts toward the membrane carrier 602 in the absence of internal pressure. The inner barrier layer 118, which can be relatively inelastic, tends to include folds as it is constrained to the smaller volume by the outer elastic layer 120. As shown in FIG. 4, the surface area of the barrier layer 118 in a relaxed condition is greater than the surface area of the elastic layer 120 in a relaxed condition.

Figure 5A:
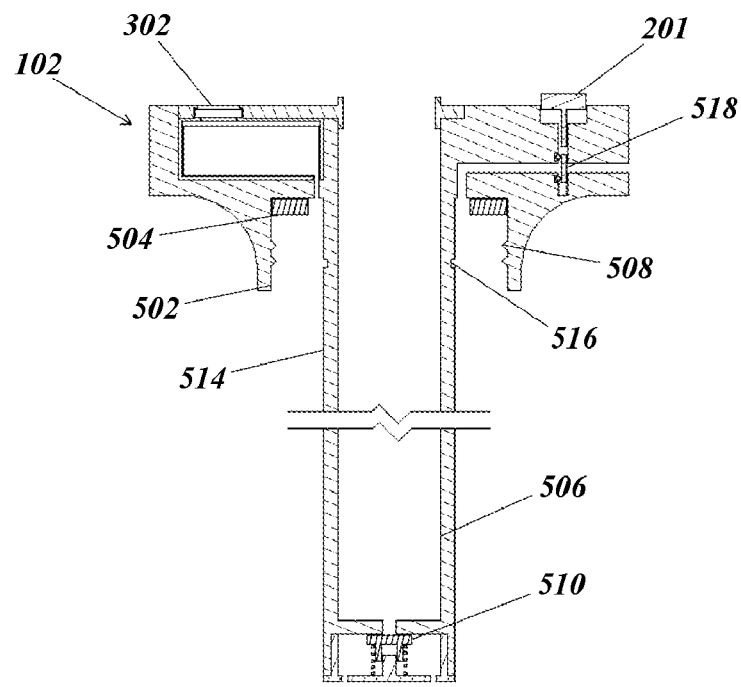
FIG. 5A is a cross-sectional view of a cap member for coupling with a beverage container, according to one embodiment.

Turning to FIG. 5A, a cross-sectional view of the cap member 102 for coupling with a beverage container according to one embodiment is shown. The cap member 102 includes an opening, such as a threaded opening 502, to receive and couple with a bottleneck. In doing so, threads 508 of the threaded opening 502 can interlock or mate with the threads of the bottleneck (not shown) and the seal 504 can prevent fluid from escaping the beverage container. In one embodiment, the threaded opening 502 and threads 508 are configured to accept standard threaded bottlenecks having thread diameter of 28 millimeter (mm), an inner diameter of about 21.7 mm, and about 6 to about 10 threads per inch. It will be appreciated that the cap member 102 can be configured to fit within and seal other applicable bottlenecks, such as unthreaded wine bottles (see FIGS. 2C and 2D and related text).

The cylinder 506 of the cap member 102 can slidably receive the piston sub-assembly 110a (see FIG. 5B) for inflating the inflatable member 108. The cylinder 506 of FIG. 5A extends longitudinally through the center of the cap assembly 100a and terminates at a pump valve 510. In one embodiment, the cylinder 506 is sized to allow a relatively long stroke and relatively large bore to move a relatively large amount of gas, thereby reducing the number of pumps to inflate the inflatable member 108. In some embodiments, the cylinder 506 can define a stroke length between approximately 220 millimeters (mm) and approximately 340 mm, and a bore diameter between approximately 14 mm and approximately 27 mm. Stroke lengths and bore sizes in these ranges can reduce user fatigue. It will be appreciated that other applicable stroke lengths and bore sizes can be selected. In other embodiments, the cap assembly need not incorporate a pump.

The cylinder 506 of the cap member 102 can detachably couple to the carrier sub-assembly 106 (see FIG. 6A) for coupling the cylinder 506 to the inflatable member 108. For example, the cap member 102 of FIG. 5A has an exterior cylinder surface 514 which defines a coupling interface, such as a detent 516, for coupling with the carrier sub-assembly 106. In particular, the detent 516 provides a structure to which the carrier sub-assembly 106 can latch, as discussed below in connection with FIG. 6A.

The pump valve 510 of the cap member 102 is configured to selectively open a pathway for gases to pass between the cylinder 506 and the inflatable member 108. The pump valve 510 may be any applicable valve, such as a spring or otherwise loaded valve, to selectively allow air flow into or out of the inflatable member 108. For example, in operation pumping the piston sub-assembly 110a within the cylinder 506 causes pressure to build up in the cylinder 506 such that the spring-loaded pump valve 510 opens, thereby providing gas through the open pump valve 510 to the inflatable member 108 for inflation. When the piston sub-assembly 110a is not being pumped, the spring-loaded pump valve 510 closes to prevent gas from escaping the inflatable member 108, thereby maintaining the pressure inside the inflatable member 108. Pressing the actuator member 202a can also manually open the pump valve 510 for release of air from the inflatable member 108, as described below with reference to FIG. 5B and the actuator member 202a. In some embodiments, the pump valve 510 automatically vents the beverage container when the internal pressure exceeds a safety threshold.

The cap member 102 may contain a pressure relief valve 518, activated by the pressure relief button 201. FIG. 5A shows a pressure relief valve 518 incorporated into the cap member 102. The pressure relief valve 518 permits venting of gas from inside the beverage container. For example, opening the pressure relief valve 518 allows the headspace to be vented as the inflatable member 108 is inflated while the cap member 102 is sealed onto the bottleneck. This permits the user to seal the cap member 102 onto the bottleneck from the outset of use, rather than loosely attaching the cap member 102 to the bottleneck while pumping then sealing after headspace venting is complete. In operation, the user may manually open the pressure relief valve 518 using pressure relief button 201 to vent the gases from the headspace as the inflatable member 108 is inflated or after inflation if a pressurized remaining headspace is not desired. Once the unconfined headspace is vented, the pressure relief valve 518 can be closed, thus sealing the interior of the bottle so that the pressure may be increased to a desired pressure. Alternatively or additionally, an automatic pressure relief valve 518 could be employed to purge gases in the unconfined headspace during the initial pumping phase therefore avoiding the need for the user to manually open and close a valve. A two-way automatic pressure relief valve could be further employed to relieve any vacuum that forms within the container while the inflatable member 108 is deflated. In some embodiments, the pressure relief valve 518 automatically vents the beverage container when the internal pressure exceeds a safety threshold.

As stated in connection with FIGS. 3A and 3B, the cap member 102 can contain a pressure gauge 302. Accordingly, in FIG. 5A the cap member 102 is shown having a pressure gauge 302 fluidly connected to the interior side of the cap member 102, inside of the seal 504. Thus, the pressure gauge 302 is fluidly connected with the interior of the bottle via at least one pathway in the cap member 102. As stated, pressure can be monitored with the pressure gauge 302, for example, as the piston sub-assembly 110a pressurizes the beverage container. The pressure gauge 302 can be electronic or mechanical in nature.

Although FIG. 5A shows the pressure gauge 302 as being housed in the cap member 102, it will be appreciated that in other embodiments the pressure gauge 302 may be housed within an external enclosure such as, for example, an external mechanical or electric pump enclosure, particularly for embodiments such as FIG. 2B.

A variety of bottles and beverage containers can be compatible with the cap member 102. In particular, one embodiment of the cap assembly 100 can work with SODA STREAM™ containers (SODASTREAM INTERNATIONAL LTD., Airport City, Israel). For example, the opening 502 and the threads 508 can be structured to be compatible with SODA STREAM™ containers. In fact, the coupling mechanism of the cap member 102 can be any applicable bottle coupling mechanism, such as various threads sizes, latches, quick release mechanisms, swing tops, levers, and the like (see FIGS. 2C and 2D).

Figure 5B:
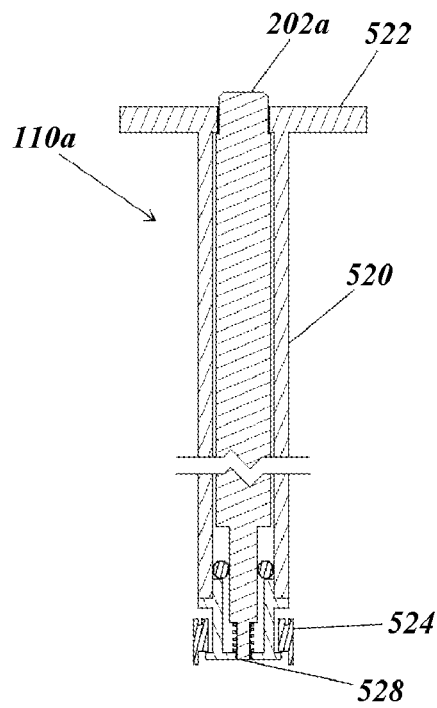
FIG. 5B is a cross-sectional view of a piston sub-assembly for use with the cap member of FIG. 5A, according to one embodiment.
Figure 6A:
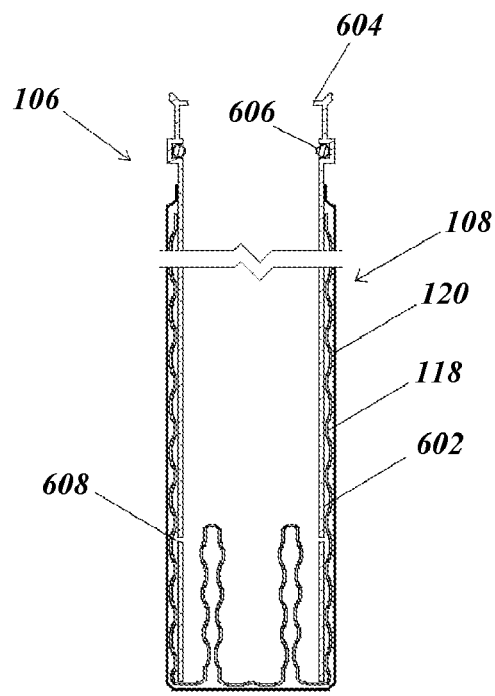
FIG. 6A shows a cross-sectional view of a carrier sub-assembly having a membrane carrier and a double-layer inflatable member for use with the cap member of FIG. 5A, according to one embodiment.

Now turning to the piston sub-assembly 110a, FIG. 5B shows a cross-sectional view of the piston sub-assembly 110a for use with the cap member 102 of FIG. 5A to inflate the inflatable member 108 of FIG. 6A, according to one embodiment. In particular, the piston sub-assembly 110a of FIG. 5B includes a piston 520 for slidably engaging into the cylinder 506 of the cap member 102. The piston 520 includes a handle region 522 towards the proximal end of the piston 520 for providing a grip for the user to pump the piston 520 in a reciprocating manner. The piston 520 further includes a piston valve 524 about the distal end of the piston 520 to create a seal with the cylinder 506 of the cap member 102 when the piston 520 is moving into the cylinder 506, and allows gas to pass between the piston valve 524 when the piston 520 is moving out of the cylinder 506.

In some embodiments, the piston sub-assembly 110a also includes an actuator member 202a for selectively opening the pump valve 510 of the cap member 102 to vent the pressure inside the inflatable member. The actuator member 202a of FIG. 5B is slidably disposed longitudinally through the piston 520 such that one end is exposed at the handle region of the piston 520, and another end of the actuator member 202a has an actuator tip 528 at the distal end of the actuator member 202a. The actuator member 202a of FIG. 5B is spring loaded such that when the actuator member 202a is pressed down at the handle region 522 of the piston 520, the actuator tip 528 protrudes out of the piston 520. In doing so, when the piston sub-assembly 110a is coupled with the cap member 102 (FIG. 5A), the actuator tip 528 opens the pump valve 510 (see FIG. 4 for the structural relationship of the pump valve 510 and the actuator tip 528 when coupled together), thereby releasing the air from the inflatable member 108. For example, when the actuator tip 528 opens the pump valve 510, gas from the inflatable member 108 is allowed to escape by passing through the piston valve 524 and out of the cap member 102.

While the piston sub-assembly 110a is shown integrated with the cap assembly 100a in the FIGS. 4, 5A, and 5B, as previously noted, a manual pump could be provided separately from the cap assembly 100a in order to provide greater compactness. Such an external manual pump can also comprise a pressure gauge and/or relief valve. Alternatively, a gas supply line could be connected to the cap assembly 100a to inflate the inflatable member 108, substantially as described above with reference to FIG. 2B. Still additionally or alternatively, an electric pump may be provided, powered by a battery or external power source, to inflate the inflatable member 108. The electric pump could be integrated into the cap assembly 100a, or it may be an external unit that temporarily attaches to the cap assembly 100a, pressurizes the container, and then is detached. Additionally, the inflatable member 108 may be inflated with a gas other than air (for example, $O_2$, $CO_2$, $N_2$, inert gases or combinations thereof). Compressed gas from a supply system or cylinder, external or internal, may be incorporated with the cap assembly to inflate the inflatable member 108.

FIG. 6A shows a partial cross-sectional view of the carrier sub-assembly 106 having a membrane carrier 602 and the inflatable member 108 for use with the cap member 102 of FIG. 5A, according to one embodiment. FIG. 6A shows the inflatable member 108 in its natural deflated state, in the absence of pressure, coaxially surrounding the membrane carrier 602. The inflatable member 108 is shown contacting the external surface of the membrane carrier 602. The proximal region of the inflatable member 108 defines an open end that can hold fluid tightly in place on the membrane carrier 602 by an adhesive, weld, fusing, or other like bond. Alternatively or additionally, the open end of the inflatable member 108 can be held in place on the membrane carrier 602 by a clamp, binding, clip or other attachment means capable of creating fluid-tight seals.

The carrier sub-assembly 106 of FIG. 6A further includes a coupling mechanism, such as a latch 604, and a sealing mechanism, such as an O-ring seal 606, for coupling or mating with the cap member 102 of FIG. 5A. In particular, the latch 604 is adapted to detachably connect with the cap member 102 of FIG. 5A, and in particular, to mate with the detent 516 of the cap member 102. The O-ring seal 606 fluidly seals an opening or aperture of the proximal end of the carrier sub-assembly 106 with the cylinder 506 of the cap member 102. The carrier sub-assembly 106 can have other means of connection and sealing with the cap member in other embodiments (see, e.g., FIGS. 7A and 7B and corresponding text), including integral formation. If detachably connected, however, the connection is sufficiently strong that the inflatable member 108 inflates under pressure rather than forcing the carrier 602 to detach.

In operation, the carrier sub-assembly 106 forms a second pathway that fluidly couples with the pathway of the cap member 102. Gas passing through the pump valve 510 of the cap member 102 passes through an aperture of the proximal end of the carrier sub-assembly 106, as shown in FIG. 6A. Gas can travel through an interior space of the carrier sub-assembly 106 to a second aperture (e.g., defined by the distal end of the membrane carrier 602 and/or vent apertures 608, as discussed below) for communicating gas to the inflatable member 108 for inflating and deflating the inflatable member 108. It will be understood that, upon assembly, the pathway through the cap member 102 and the second pathway through the carrier sub-assembly 106 can form a continuous passage for inflation of the inflatable member 108.

The membrane carrier 602 defines the second pathway that can be fluidly connected to and disposed between the pathway of the cap member 102 and the inflatable member 108. The carrier membrane 602 of FIG. 6A has an opening at its proximal end for communicating gas with the cap-piston sub-assembly. Gas may travel through the membrane carrier 602 to its distal end. For example, the membrane carrier 602 may be cylindrical. At the distal end, the membrane carrier 602 has an opening which provides a port for gas to travel between the membrane carrier 602 and the inflatable member 108. The membrane carrier 602 also includes vent apertures 608 through the side of the membrane carrier 602 to facilitate inflation and deflation of the inflatable member 108 when the piston 520 is operated to inflate or the actuator member 202a is actuated to deflate the inflatable member 108. Vent apertures 608 serve to more evenly inflate and deflate the inflatable member 108 compared to inflation from the bottom alone by causing separation of the inflatable member 108 from the outer walls of the membrane carrier 602 and creating additional channels for inflation. While the membrane carrier 602 of FIG. 6A has openings at its distal end and through its side wall (e.g., vent apertures 608), other embodiments may have either a closed distal end or no vent apertures through its side walls.

FIG. 6A shows the barrier layer 118 and the elastic layer 120 as being independent layers each having an opening sealed to the membrane carrier 602. In one embodiment, the barrier layer 118 and the elastic layer 120 are sealed together about their openings, and together the two layers 118, 120 are sealed around the membrane carrier 602. The two layers 118, 120 are not attached anywhere else. In another embodiment, the elastic layer 120 is attached to the barrier layer 118 at discrete areas. In this case there are one or more areas in which the layers 118, 120 are not attached to each other, so that the elastic layer 120 can expand or contract relative to the barrier layer 118.

In inflation operation, the membrane carrier 602 receives gas and communicates it to the barrier layer 118. The barrier layer 118 captures the gas and inflates. In some embodiments, the barrier layer 118 is relatively inelastic and does not substantially expand as it inflates. For example, FIG. 6A shows that the barrier layer 118 is folded on itself when deflated in order to fit within the elastic layer 120. The barrier layer 118 then unfolds as it inflates. Furthermore, as the barrier layer 118 inflates, the elastic layer 120 expands due to the increased volume of the barrier layer 118. The elastic layer 120 is pushed out radially by the barrier layer 118, and since the two layers 118, 120 are not completely integrated with each other (e.g., in contrast to a layer with a coating), the barrier layer 118 is allowed to unfold and the elastic layer 120 is free to expand (e.g., stretch) relative to the barrier layer 118. A lubricant can be disposed in between the two layers 118, 120 to aid the process.

In deflation operation, gas is allowed to escape out of the proximal end of the membrane carrier 602, deflating the barrier layer 118. Accordingly, the elastic layer 120 exerts an inward force on the barrier layer 118 that may cause the barrier layer 118 to collapse. Because the barrier layer 118 may have a larger dimension than the partially deflated or fully deflated elastic layer 120, the barrier layer 118 may tend to fold onto itself as it collapses. When fully deflated, the elastic layer 120 compresses the barrier layer 118 against the membrane carrier.

Figure 6B:
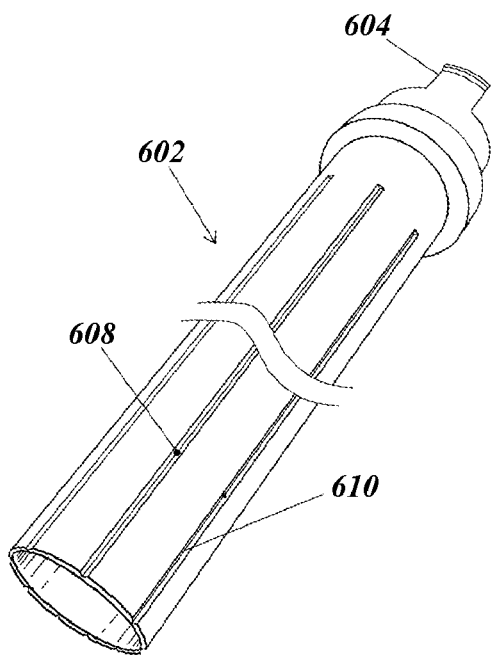
FIG. 6B shows a perspective view of the carrier sub-assembly of FIG. 6A, according to one embodiment.

FIG. 6B shows a perspective view of the carrier sub-assembly of FIG. 6A without the inflatable member 108, according to one embodiment. The external surface of the membrane carrier 602 may comprise longitudinal grooves 610 to allow air to evenly pass between the inflating or deflating inflatable member 108 and the exterior surface of the membrane carrier 602. The vent apertures 608 may communicate with the grooves 610.

Figure 7B:
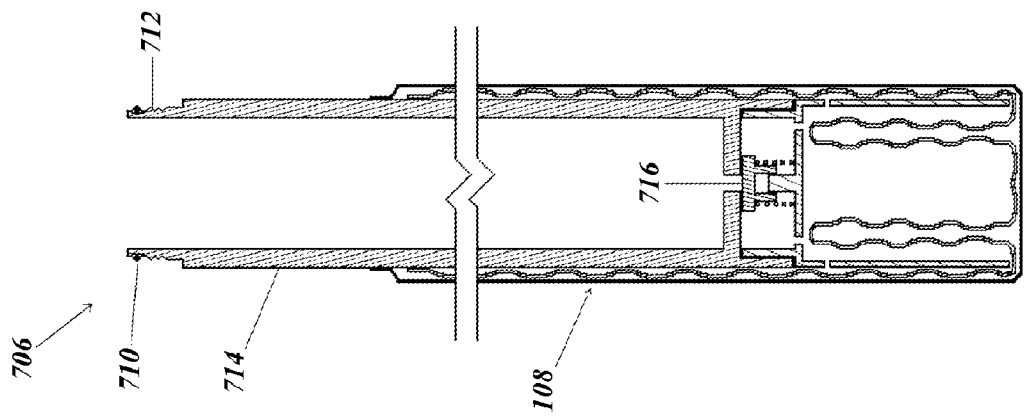
FIG. 7B shows a cross-sectional view of a carrier sub-assembly having a membrane carrier and double-layer inflatable member for use with the cap member and the piston sub-assembly of FIG. 7A, according to one embodiment.
Figure 7A:
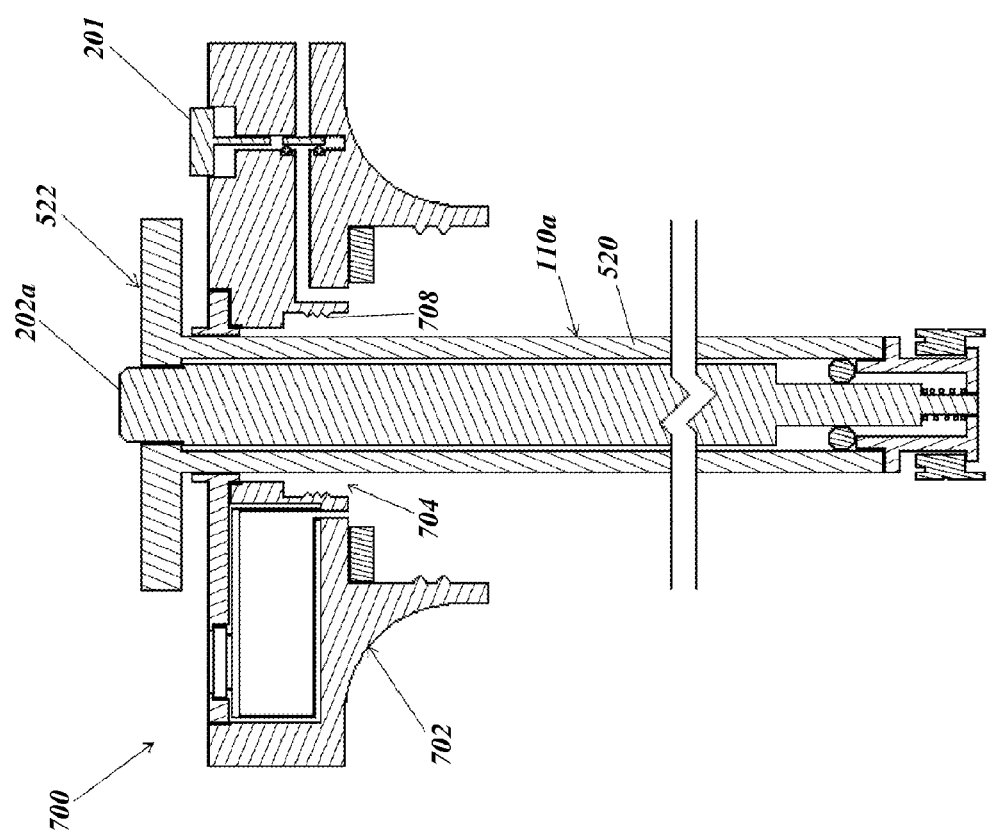
FIG. 7A shows a cross-sectional view of a cap-piston sub-assembly comprising a cap member and a piston sub-assembly, according to another embodiment.

FIG. 7A shows a cross-sectional view of a cap-piston sub-assembly 700 comprising a cap member 702 and a piston sub-assembly 110a, according to another embodiment. The cap member 702 has a second opening 704 for receiving a carrier sub-assembly, such as the carrier sub-assembly 706 shown in FIG. 7B. The second opening 704 has internal threads 708 for coupling with corresponding external threads 712 of the carrier sub-assembly 706. The piston sub-assembly 110a can be similar to the piston sub-assembly 110a described in connection with FIG. 5B. In contrast with the cap member 102 of FIG. 5A, the cap member 702 of FIG. 7A does not have a structure corresponding to the cylinder 506 shown in FIG. 5A. Instead, as described below, the carrier sub-assembly 706 forms a similar structure as the cylinder 506 when the carrier sub-assembly 706 is coupled to the cap member 702.

FIG. 7B shows a cross-sectional view of the carrier sub-assembly 706 for use with the cap-piston sub-assembly 700 of FIG. 7A, according to one embodiment. The carrier sub-assembly 706 includes an external O-ring 710 and external threads 712 for coupling to and sealing with the cap member 702. That is, the internal threads 708 of the cap member 702 couple with the threads 712 of the carrier sub-assembly 706. It will be appreciated that other applicable coupling mechanism can be selected; such as latches, quick releases, and the like (see FIGS. 5A and 6A and attendant text).

Furthermore, the carrier sub-assembly 706 includes a dual cylinder-membrane carrier 714 and the inflatable member 108. The dual cylinder-membrane carrier 714 includes a pump valve 716 for selectively opening a pathway for gases to pass between the dual cylinder-membrane carrier 714 and into the inflatable member 108. One advantage of the embodiment illustrated in FIGS. 7A and 7B is that the cylinder 506 of FIG. 5A is eliminated since the dual cylinder-membrane carrier 714 serves a dual role of the cylinder 506 and the membrane carrier 602 of FIGS. 5A and 6A. Accordingly, during operation when the cap member 702, piston sub-assembly 110a, and the carrier sub-assembly 706 couple, the piston 520 shown in FIG. 7A creates a seal with the inner surface of the dual cylinder-membrane carrier 714 and functions as a pump. It will be appreciated that other applicable methods of supplying gas can be selected, such as external pumps and gas supplies. One advantage of the embodiment of FIGS. 5A and 6A is that the carrier sub-assembly 106, which likely will wear out faster than the cap member 102/702 or piston sub-assembly 110a, is less expensive and less complicated than the carrier sub-assembly 706 of FIG. 7B.

Figure 8:
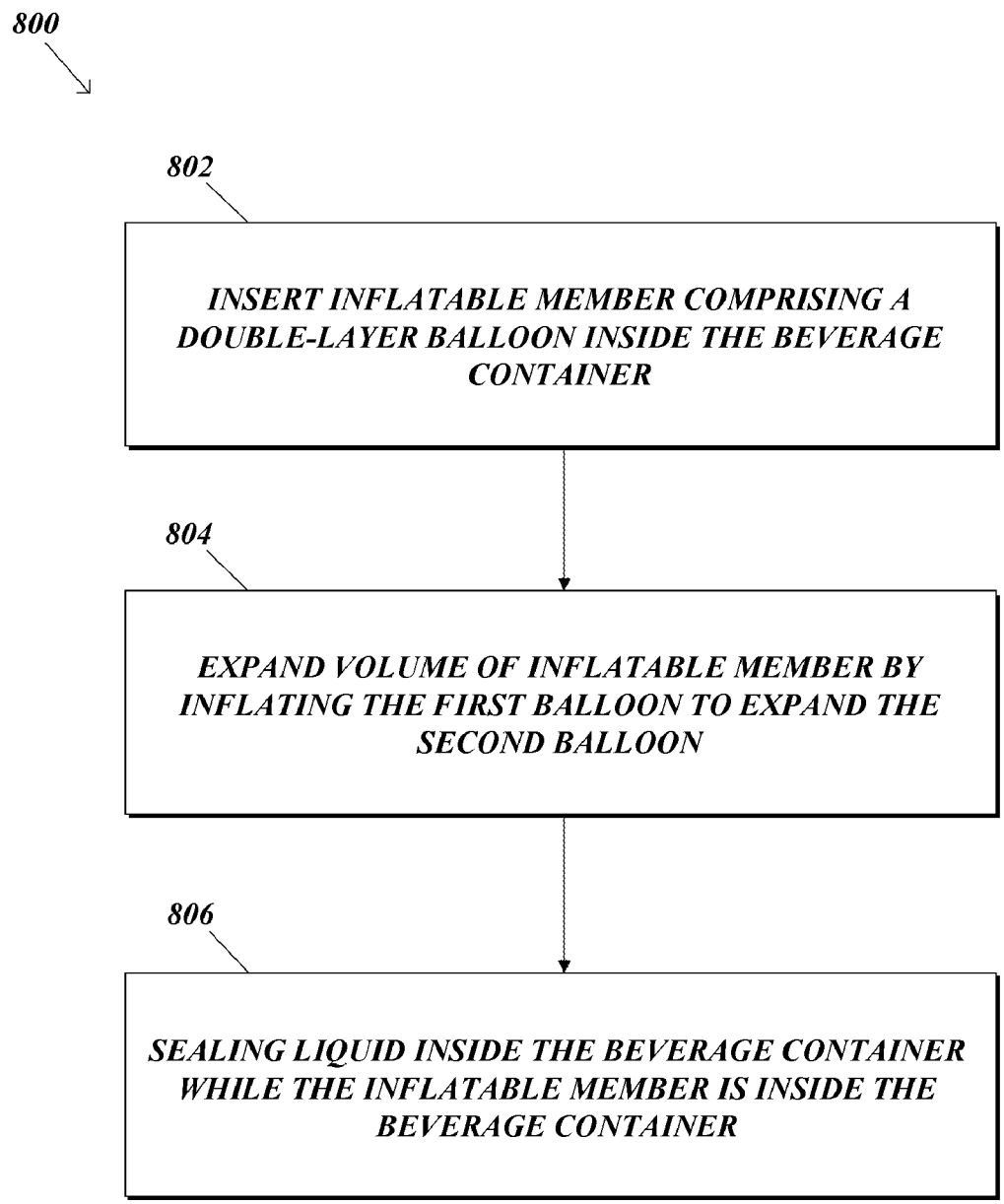
FIG. 8 is an illustrative flow diagram of an example method 800 for removing a headspace of a beverage container according to an embodiment.

FIG. 8 is an illustrative flow diagram of an example method 800 for reducing headspace of a beverage container according to an embodiment. The method starts at block 802 wherein an inflatable member comprising a double-layer balloon is inserted into a beverage container. For example, the cap assembly 100 of FIG. 1A can be coupled to a bottleneck 112 of beverage container 104. In doing so, since the inflatable member 108 is coupled to the cap member 102, the inflatable member 108 is inserted into the beverage container 104. In one embodiment the cap member 102 is tightly coupled to the bottleneck 112. In another embodiment, the cap member 102 is placed loosely about the bottleneck 112.

Once the inflatable member is inside the beverage container, the method 800 moves to block 804 for expanding the volume of the inflatable member while the inflatable member is inside the beverage container. The first or inner balloon (e.g., inner barrier layer 118) can be inflated. In doing so, a second or outer balloon (e.g., outer elastic layer 120) can be expanded. Referring to the example of FIG. 1B, the piston sub-assembly 110a of the cap member 102 can be used to inflate the inner barrier layer 118. As the inner barrier layer 118 inflates, the outer elastic layer 120 expands. The resulting increased volume of the inflatable member 108 either displaces or pressurizes the headspace above the liquid 114 within the beverage container 104.

While the inflatable member is inside the beverage container, the method 800 can execute block 806 to seal the liquid inside the beverage container. Sealing can be done in a variety of ways. In one embodiment, a bottle cap (e.g., cap assembly 100a of FIG. 2A) can be coupled to the opening of the beverage container to form a fluid-tight seal, prior to or after block 804. In another embodiment, the inflatable member can be inflated until the inflatable member forms a fluid-tight seal against the interior surface of the beverage container. The inflatable member may be configured to expand into a shape suitable for forming a seal with the beverage container. For example, the second or outer balloon (e.g., the elastic layer 120) may be biased towards expanding laterally to aid in sealing. If the inflatable member is used to create a seal, a cap for sealing the beverage container need not be required. It will be appreciated that the expanding of block 804 and the sealing of block 806 may be performed in any applicable order, including simultaneously or alternatingly.

In one embodiment, once the inflatable member at least starts to expand, the method 800 can include venting gas through a vent pathway from the headspace to environs outside of the beverage container by displacing the gas as a result of expanding inflatable member. For example, the cap member 102 can be loosely placed on the bottleneck 112. Thus, the air of the headspace is displaced out of the beverage container 104 along fluid path A simultaneously as the inflatable member 108 expands. In another embodiment, the cap assembly 108 is tightly screwed to the bottleneck 112. The air of the headspace can be vented by, for example, pressing pressure relief button 201 to open pressure relief valve 518 of FIG. 5A. Pressing and holding down the button 201 can be done simultaneously with pumping the piston sub-assembly 110a, or after the inflatable member has at least partially inflated and pressure has built up internally in the beverage container 104, intermittently or after completing inflation. Method 800 can continue to perform blocks 804 and venting until the headspace has been adequately removed. Venting need not be performed, or can be performed only after an initial expansion of the inflatable member to remove headspace, where pressurization of remaining headspace is desired.

Figure 9:
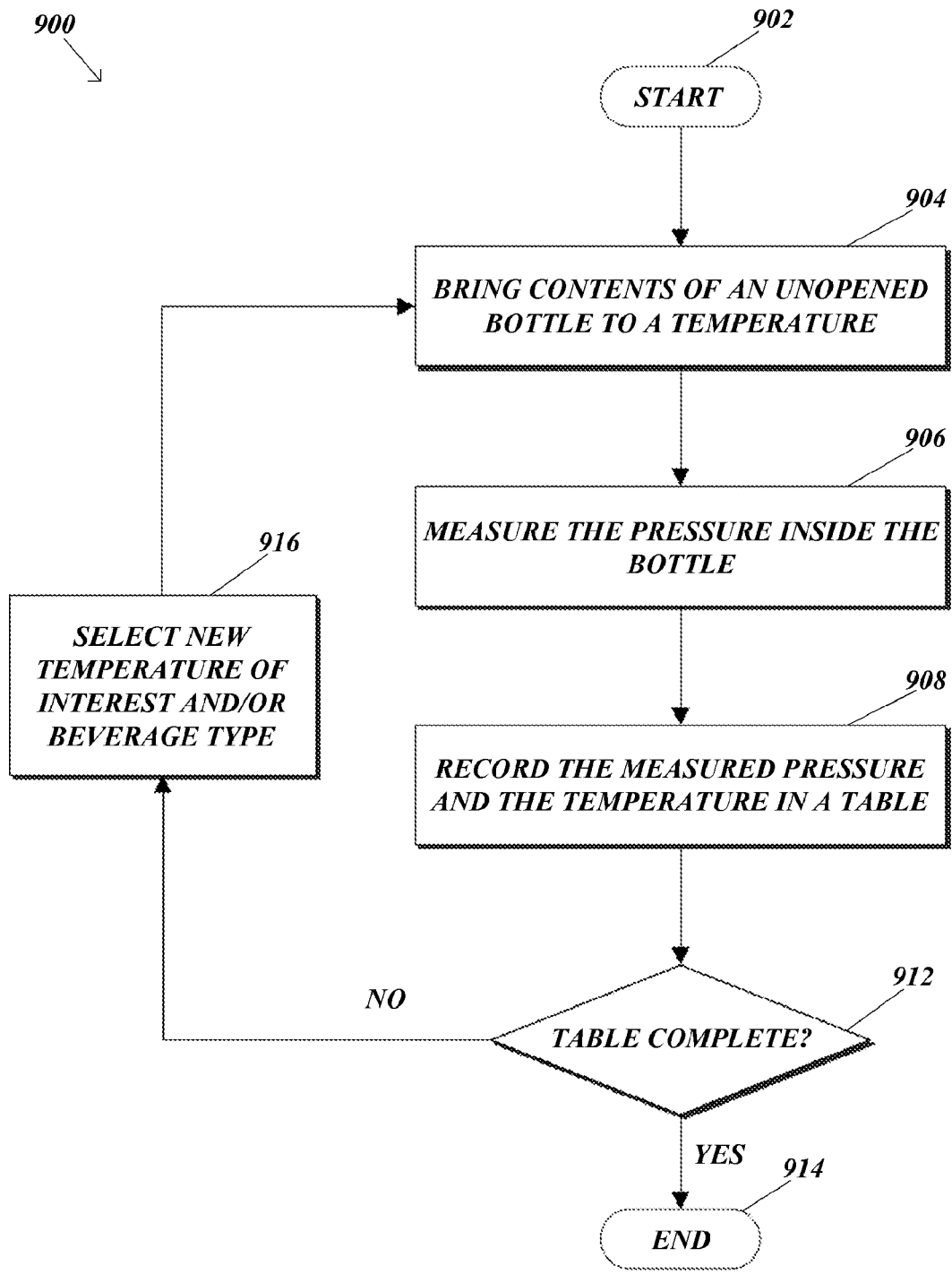
FIG. 9 is an illustrative flow diagram of an example process for generating a look-up table, such as a beverage headspace pressure table.

Turning to FIG. 9, a process 900 for generating a look-up table, such as the beverage headspace pressure table of Table 1, is shown. The look-up table can be used to determine an amount of pressure that particular beverages have as provided by the manufacturer, for a given temperature, and a user can employ a pressurizing device (such as the cap assembly 100 of FIGS. 1A-1D) to provide a matching pressure to the inside of a particular beverage container after opening. The process starts at block 902 and proceeds to block 904 for bringing an unopened bottle to a temperature of interest, where the unopened bottle contains a particular brand or type of beverage. The types of beverages that may be categorized broadly (e.g., category of beverage: soda, beer, and sparkling wine) or finely (e.g., by types of sodas: cola soda, lemon-lime soda, and grape soda; or even by brands of a type of soda: Brand 1 cola, Brand 2 cola, etc.). The contents of a bottle (e.g., "Cola Brand 1" listed in Table 1) can be brought to a temperature, for example, by refrigerating the bottle for a period of time sufficient to bring the contents of the bottle to the desired temperature (e.g., 36.5° Fahrenheit).

Once the bottle is at the temperature of interest, the process 900 proceeds to block 906 for measuring the pressure inside the bottle. The pressure may be measured by way of a pressure measuring device. The pressure measuring device may define a pathway or membrane between the headspace of the bottle and outside the bottle. For instance, an opening or hole can be created through the original bottle cap such that the headspace communicates fluidly with a device chamber or other sealed area for measuring. The volume of the device chamber can be sized sufficiently small so as to not substantially affect the internal headspace pressure when gas of the headspace is released into the chamber. For example, the additional volume presented by the measurement device can be less than about 0.5 $cm^3$ to about 3.0 $cm^3$. In addition or alternative to using a pathway, a membrane may replace a portion of the bottle or the original cap, where the membrane indicates pressure, for example, by way of membrane deflection.

After the pressure is measured, the process 900 moves to block 908 for recording the measured pressure and the temperature of interest in the look-up table (e.g., the beverage headspace pressure table). For example, with regard to Table 1, the measured pressure and temperature of interest associated with Cola Brand 1 may be entered into the first row of Table 1, as shown. The look-up table may correspond to computer-program data structure or a physical typographical realization. The look-up table may, for example, be printed on the cap assembly or on packaging or instructions accompanying the cap assembly.

It will be appreciated that the recorded temperature may correspond to a measurement made, for example, before, during, or after measuring pressure. For example, temperature can be measured during block 904 to verify that the contents of the bottle have been brought to the temperature of interest.

In one embodiment, process 900 repeats blocks 904-906 a number of times and records the average pressure at block 908 for a given beverage and temperature.

Once pressure and temperature are recorded, the process 900 checks whether the look-up table is complete at block 912. If the look-up table is complete, the process 900 ends at block 914. Otherwise the process 900 continues to block 916 for selecting a new temperature of interest and/or new beverage type (for example, Cola Brand 2 of Table 1). Pressure measurements can be performed for multiple different beverage types, each at multiple different temperatures. For example, if it is desired to have a second temperature (not shown) of interest for Cola Brand 1 of Table 1, the process 900 can repeat blocks 904-912 for the second temperature of interest. The same bottle or a new bottle may be used in performing blocks 904-908. Rather than measuring the beverage container pressure as manufactured for different temperatures, it will be appreciated that after at least one measurement for a specific beverage, additional pressures may be calculated or approximated for different temperatures of that beverage using numerical (e.g., numerical interpolation/extrapolation), theoretical (e.g., based on Henry's law, Dalton's law, the ideal gas law, etc.), and/or empirical methods.

In one embodiment, the process 900 can be carried out by using a device (not shown) having a hollow barb that is operatively coupled to a pressure gauge. In operation, the hollow barb pierces the beverage manufacturer's bottle cap and seals the hole it created in a way that the gas of the headspace can only escape through the hollow portion of the barb to an area fluidly connected to the pressure gauge. After reading the pressure, the temperature of the liquid can be measured, for example, with a digital thermometer.

Figure 10:
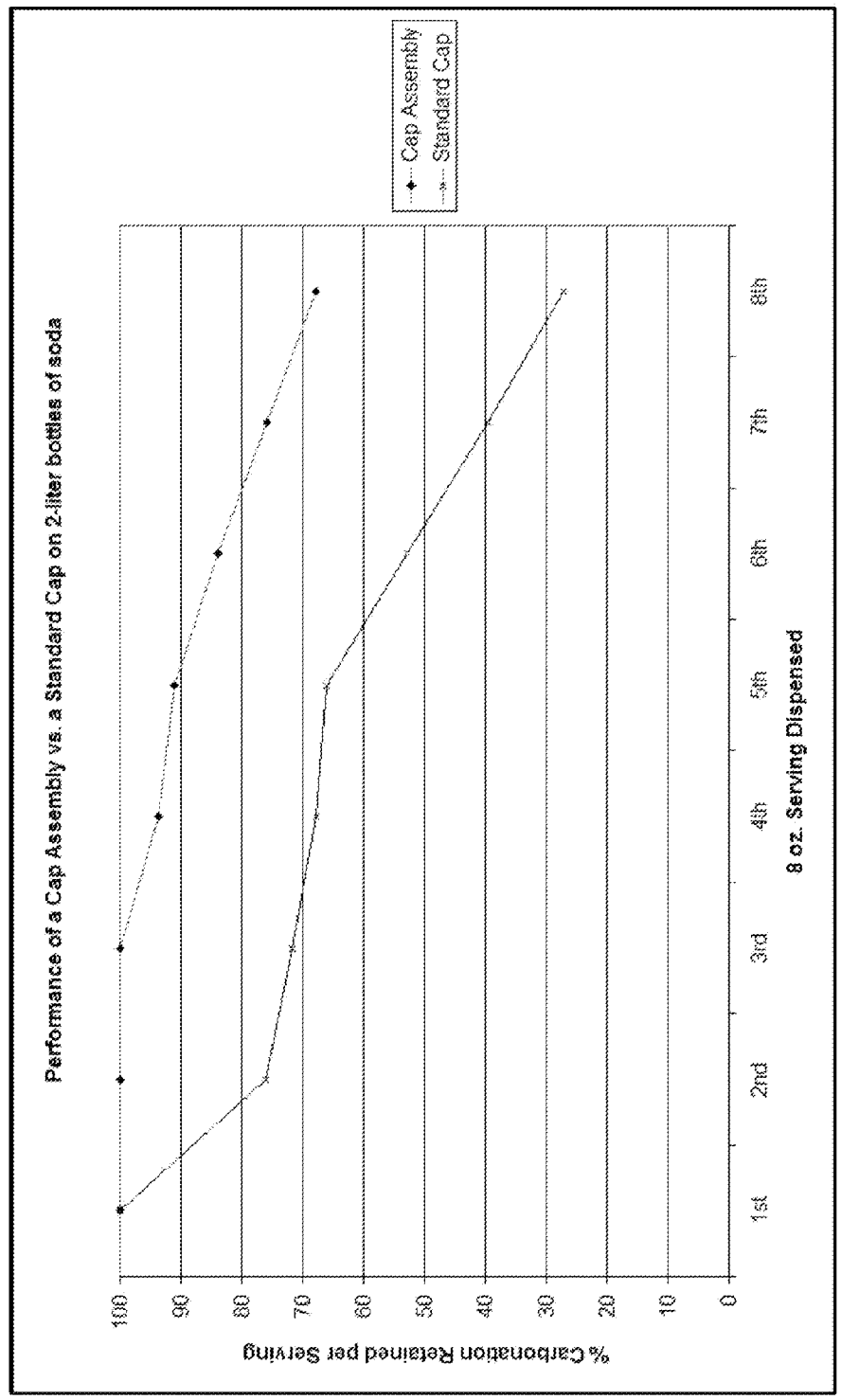
FIG. 10 is a graph depicting the results of an experiment measuring the $CO_2$ percentage in soft drink samples taken from bottles using a cap assembly according to an embodiment of the present invention compared to a conventional bottle cap.

FIG. 10 is a graph 1000 of data from testing of a cap assembly in accordance with embodiments described herein versus use of a standard soda cap for resealing a soda bottle. In particular, the $CO_2$ content of a serving was measured following progressive removal of 8 ounce (oz.) servings from a 2 liter plastic bottle stored 24 hours between servings in a refrigerator at 38 degrees Fahrenheit. The cap assembly 100a of FIG. 4 was employed, with inflation of the double-layer balloon and venting of headspace prior to sealing after pouring out of each successive 8 oz. serving. After sealing the soda bottle with the double-walled balloon inside the soda bottle, the double-walled balloon was provided additional gas to pressurize the remaining contents of the soda bottle to about 24.2 PSI. The control data was obtained by simply reapplying the threaded cap that came with the soda bottle after pouring out each successive 8 oz. serving. As shown in FIG. 10, using the cap assembly 100a of FIG. 4 retained a higher percentage of $CO_2$ than using the standard cap. In fact, up to the third successive serving, the cap assembly 100a was able to preserve carbonation at the same level as the original manufacturer provided for the unopened bottle. This is evidence of the effectiveness of the cap assembly 100a and inflatable member disclosed herein to maintain the $CO_2$ levels in a carbonated beverage. It can be expected that similar preservation of non-carbonated beverages will be obtained from use of the cap assembly 100a and inflatable member disclosed herein.

While the invention has been described in connection with particular structural embodiments, modifications of the instrument may become apparent to those skilled in the art. For example, the double-layer balloon structure described herein, including a fluid impermeable and an elastic layer, can be inserted and inflated within a container using other inflation mechanisms and other modes of operation.

As one non-limiting example, U.S. Patent Publication No. 2011/0278297 of Corti describes inflation of a balloon within a container in a manner that recreates a new ceiling by sealing the balloon against the container walls at a lower level than the bottleneck. Employing the double-layer balloon described herein in place of the balloon of Corti would reduce fluid leakage. For example, an outer balloon (e.g., the elastic layer 120) can collapse the inflatable member 108 to a size that can be inserted into the beverage container. Once inside, the inflatable member can be inflated into a shape and size that forms a fluid-tight seal against the interior surface of the beverage container, positioned above the liquid contents. The space between the inflatable member 108 and the surface of the liquid contents defines a reduced headspace. Furthermore, an inner balloon (e.g., the impermeable barrier layer 118) of the inflatable member 108 inhibits the air used to inflate the inflatable member 108 from permeating into the container and contacting the liquid contents. Additionally, if the liquid is carbonated, the inner balloon inhibits carbon dioxide from permeating through the inflatable member 108 and escaping the reduced headspace. As stated above, in some embodiments the inflatable member 108 can be formed from a fluid impermeable outer balloon coupled with an inner elastic layer (e.g., an elastic net or band coupled at discrete points of the interior surface of the outer balloon).

Accordingly, such modifications are to be included within the spirit and scope of the invention as defined in the following claims.

What is claimed is:

1. A beverage container cap for resealing a beverage container, comprising:
   a cap member having an interior side for sealingly coupling with an opening of the beverage container, the cap member defining a pathway for selectively communicating gas through the cap member; and
   an inflatable member configured to couple to the cap member and to expand in volume upon receiving gas from the pathway, the inflatable member including:
   a first layer for capturing gas received by the inflatable member, thereby inflating, wherein the first layer is fluid impermeable; and
   a second layer operatively coupled to the first layer such that the second layer expands upon the first layer inflating,
   wherein the first layer and second layer are unattached to each other at one or more areas to allow the second layer to expand or contract relative to the first layer, and wherein a surface area of the first layer in a relaxed condition is greater than a surface area of the second layer in a relaxed condition.

2. The beverage container cap of claim 1, wherein the first layer is a more fluid impermeable layer than the second layer, and the second layer is an elastic layer configured to collapse upon deflation of the inflatable member.

3. The beverage container cap of claim 2, wherein the first layer has an oxygen transmission rate of about 0 to 200 cubic centimeters·0.001 inch/100 square inches·day·atmosphere at 73° Fahrenheit and 0% relative humidity ($cm^3$·mil/100 $in^2$·24 hr·atm@73 F, 0% RH), and the second layer has a tensile modulus at 100% of about 0 to 20 megapascals (MPa).

4. The beverage container cap of claim 2, wherein the first layer comprises polyvinylidene chloride, and the second layer comprises natural latex rubber.

5. The beverage container cap of claim 1, wherein the first layer and second layer each comprises an open end, wherein the open end of the first layer is fluidly coupled to the pathway such that the first layer inflates upon receiving gas from the pathway, wherein the open end of the second layer is operatively coupled to first layer such that the first layer is configured to inflate inside the second layer, thereby causing the second layer to expand upon the inflatable member receiving gas.

6. A beverage container cap for resealing a beverage container, comprising:
- a cap member having an interior side for sealingly coupling with an opening of the beverage container, the cap member defining a pathway for selectively communicating gas through the cap member;
- an inflatable member configured to couple to the cap member and to expand in volume upon receiving gas from the pathway, the inflatable member including:
  - a first layer for capturing gas received by the inflatable member, thereby inflating, wherein the first layer is fluid impermeable, and
  - a second layer operatively coupled to the first layer such that the second layer expands upon the first layer inflating,
  - wherein the first layer and second layer are unattached to each other at one or more areas to allow the second layer to expand or contract relative to the first layer; and
- a membrane carrier having a first portion for coupling to the cap member and a second portion for coupling to the inflatable member.

7. The beverage container cap of claim 1, wherein the second layer is an outer elastic layer surrounding the first layer, the second layer being configured to expand into a shape having a longitudinal groove defined on an exterior surface.

8. The beverage container cap of claim 1, wherein the first layer defines a first balloon, the second layer defines a second balloon surrounding the first balloon, and a gap is defined between the first and second balloons.

9. The beverage container cap of claim 1, further comprising a food-grade lubrication medium disposed between the first layer and the second layer.

10. The beverage container cap of claim 1, further comprising a first valve disposed in the pathway for selectively opening and closing the pathway, the first valve biased toward closing and configured to open upon receiving pressurized gas.

11. The beverage container cap of claim 10, wherein the cap member comprises a second valve disposed in a vent defined through the cap member, the vent having interior and exterior ends, wherein the second valve is configured for manual opening.

12. The beverage container cap of claim 1, further comprising a pressure gauge for indicating a pressure sensed at the interior side of the cap member.

13. The beverage container cap of claim 6, wherein a surface area of the first layer in a relaxed condition is greater than a surface area of the second layer in a relaxed condition.

14. The beverage container cap of claim 6, wherein an open end of the inflatable member is disposed about an exterior of the second portion of the membrane carrier.

15. The beverage container cap of claim 6, wherein the membrane carrier defines a second pathway that is fluidly connected to and disposed between the pathway of the cap member and the inflatable member.

16. The beverage container cap of claim 6, wherein the membrane carrier is detachable from the cap member for removing the inflatable member.

17. The beverage container cap of claim 6, wherein the membrane carrier has an exterior surface that defines a longitudinal groove for carrying gas between the membrane carrier and the inflatable member while the inflatable member deflates.

18. The beverage container cap of claim 1, further comprising a pump fluidly coupled to the pathway of the cap member, the pump configured to selectively provide gas to the pathway for expanding the inflatable member in volume.

19. The beverage container cap of claim 1, further comprising a gas supply valve fluidly coupled to the pathway for coupling to an external gas supply to provide gas to the pathway for expanding the inflatable member in volume.

20. The beverage container cap of claim 1, wherein the cap member comprises a spout for selectively dispensing liquid from the beverage container when the cap member is coupled to the opening of the beverage container.

21. A method for removing a headspace of a beverage container, the method comprising:
- inserting an inflatable member inside the beverage container such that the beverage container is configured to hold a liquid outside of the inflatable member, the inflatable member including first and second layers, wherein the first layer is fluid impermeable and configured to inflate, and the second layer is configured to expand upon the first layer inflating, wherein the first layer and second layer are sufficiently independent of one another to allow the second layer to expand or contract relative to the first layer;
- expanding the inflatable member inside the beverage container by inflating the first layer and thereby expanding the second layer; and
- sealing the liquid inside the beverage container while the inflatable member is inside the beverage container.

22. The method of claim 21, further comprising:
- venting gas through a vent pathway from the headspace to environs outside of the beverage container by displacing the gas as a result of expanding the inflatable member.

23. The method of claim 22, wherein expanding the inflatable member and venting gas are performed simultaneously.

24. The method of claim 22, wherein sealing liquid inside the beverage is performed after venting gas.

25. The method of claim 22, further comprising:
- increasing a pressure within the beverage container by providing the inflatable member with additional gas while the liquid is sealed inside the beverage container.

26. The method of claim 22, wherein venting gas comprises allowing the gas to escape between the threading of a screw-on cap that is loosely coupled to the beverage container, and wherein sealing liquid inside the beverage container includes tightening the screw-on cap to the beverage container such that screw-on cap creates a seal with the beverage container.

27. The method of claim 22, wherein venting gas includes opening a valve disposed in the vent pathway such that opening the valve opens the vent pathway.

28. A carrier sub-assembly comprising:
- a membrane carrier defining first and second apertures fluidly coupled by a pathway;
- a coupling for sealing the membrane carrier to a cap member about the first aperture such that gas provided from the cap member is received by the first aperture and passed along the pathway to the second aperture; and
- an inflatable member operatively coupled to the membrane carrier, the inflatable member having an open end sealed about the second aperture for expanding in volume upon receiving gas from the second aperture via the pathway, the inflatable member including:
  - a first layer configured to inflate in response to increased pressure from gas received from the second aperture; and a second layer operatively coupled to the first layer such that the second layer expands as the first layer inflates, wherein the first layer and second layer are unattached to each other at one or more areas to allow the second layer to expand or contract relative to the first layer.

29. The carrier sub-assembly of claim 28, wherein the membrane carrier defines a groove on an outer surface thereof for allowing gas to pass between the inflatable member and the membrane carrier upon deflating the inflatable member.

30. An elastic, fluid-impermeable bladder comprising:
a fluid impermeable balloon; and
an elastic balloon operatively coupled to the fluid impermeable balloon such that when the fluid impermeable balloon is inflated it expands the elastic balloon, wherein the fluid impermeable balloon is more fluidly impermeable than the elastic balloon, and the elastic balloon is more elastic than the fluid impermeable balloon.

31. The elastic, fluid-impermeable bladder of claim 30, wherein the fluid impermeable inner balloon has an oxygen transmission rate of about 0 to 200 $cm^3 \cdot mil/100\ in^2 \cdot 24\ hr \cdot atm$@73 F, 0% RH.

32. The elastic, fluid-impermeable bladder of claim 30, wherein the elastic balloon has a tensile modulus at 100% of about 0 to 20 MPa.

33. The elastic, fluid-impermeable bladder of claim 30, further comprising a non-toxic lubricant disposed between the fluid impermeable balloon and the elastic balloon.

34. The elastic, fluid-impermeable bladder of claim 33, wherein the lubricant includes a food-grade lubricant.

35. The elastic, fluid-impermeable bladder of claim 33, wherein the lubricant includes glycerin.

36. An assembly of a beverage cap, the assembly comprising:
a cap member including:
a pressure gauge for indicating a pressure sensed about the cap member;
a first coupling interface for engaging the cap member to a bottle top; and
a second coupling interface for engaging of the cap member to a carrier sub-assembly; and
a piston extending from a handle end to a crown end, the piston disposed through the cap member, the piston including:
an actuator member slidably disposed longitudinally through the piston, the actuator member extending from the handle end of the piston to an actuator end, the actuator end of the actuator member being operatively extendable out from the crown end of the piston to release a pump valve; and
a piston seal disposed about a perimeter of the piston for creating a seal with a surrounding wall for pumping.

37. The assembly of claim 36, wherein the cap member further comprises a release valve disposed in a vent defined through the cap member, the release valve for selectively opening the vent.

38. A method for generating a look-up table, the method comprising:
generating an entry of the look-up table, the entry having data corresponding to a first beverage type, a first temperature, and a pressure of the beverage type at the first temperature, generating the entry including:
bringing an unopened bottle of the first beverage type to the first temperature,
measuring pressure inside the unopened bottle at the first temperature, and
recording the measured pressure and the first temperature in the look-up table; and
repeating the generating to generate additional entries of the look-up table.

39. The method of claim 38, further comprising repeating the generating for additional temperatures for the first beverage type to generate additional entries of the look-up table.

40. The elastic, fluid-impermeable bladder of claim 30, wherein the fluid impermeable balloon is disposed within the elastic balloon.

41. The elastic, fluid-impermeable bladder of claim 30, wherein the elastic balloon is configured to collapse the elastic, fluid-impermeable bladder to a size that can be inserted into a beverage container, and wherein the elastic, fluid-impermeable bladder is configured to form a fluid-tight seal against an interior surface of the beverage container when disposed in the beverage container and when the fluid impermeable balloon is inflated.

42. The assembly of claim 36, wherein the assembly is configured such that the crown end of the piston is within the interior of the beverage container when the cap member is engaged to the bottle top.

* * * * *